United States Patent
Kwon et al.

(10) Patent No.: US 8,081,634 B2
(45) Date of Patent: Dec. 20, 2011

(54) METHOD AND APPARATUS FOR PROCESSING DOWNSTREAM PACKETS OF CABLE MODEM IN HYBRID FIBER COAXIAL NETWORKS

(75) Inventors: Ho Jin Kwon, Daejeon (KR); Seung Eun Hong, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 573 days.

(21) Appl. No.: 11/871,347

(22) Filed: Oct. 12, 2007

(65) Prior Publication Data
US 2008/0137661 A1 Jun. 12, 2008

(30) Foreign Application Priority Data
Dec. 8, 2006 (KR) .......................... 10-2006-0125013

(51) Int. Cl.
*H04L 12/28* (2006.01)
(52) U.S. Cl. ....................................... 370/394; 370/392
(58) Field of Classification Search .................. 370/389, 370/464, 412, 401, 392, 394
See application file for complete search history.

(56) References Cited

U.S. PATENT DOCUMENTS

| | | | | |
|---|---|---|---|---|
| 6,907,041 B1* | 6/2005 | Turner et al. | ................... | 370/412 |
| 2004/0141510 A1* | 7/2004 | Blanc et al. | ................... | 370/401 |
| 2006/0039380 A1 | 2/2006 | Cloonan et al. | | |
| 2006/0182139 A1* | 8/2006 | Bugajski et al. | .............. | 370/464 |
| 2007/0081538 A1* | 4/2007 | Ganji | ............................ | 370/394 |

FOREIGN PATENT DOCUMENTS

| KR | 10-2004-0002040 | 1/2004 |
|---|---|---|
| KR | 1020040068698 | 8/2004 |
| KR | 1020050072642 | 7/2005 |

\* cited by examiner

*Primary Examiner* — Dang Ton
*Assistant Examiner* — Robert M Morlan
(74) *Attorney, Agent, or Firm* — Lowe Hauptman Ham & Berner LLP

(57) ABSTRACT

A packet processing apparatus of a cable modem in hybrid fiber coaxial networks for processing a packet received from a cable modem termination system through a plurality of downstream channels is provided. A specific channel number is assigned to each channel and the cable modem termination system transmits downstream service identifier encoding information to the cable modem during an initializing process therebetween. The apparatus includes a plurality of channel receivers, each for generating an interface packet by inserting the channel number of a corresponding channel into the packet received through the corresponding channel; and an input controller that classifies the interface packet into a resequencing packet, which needs to be resequenced, and an ordinary packet, for which resequencing is not necessary, using the downstream service identifier encoding information and stores the resequencing packet and the ordinary packet.

12 Claims, 19 Drawing Sheets

RESEQUENCING TIMER LIST PER DSID

METHOD AND APPARATUS FOR PROCESSING DOWNSTREAM PACKETS OF CABLE MODEM IN HYBRID FIBER COAXIAL NETWORKS

FIELD OF THE INVENTION

The present invention relates to an apparatus and method for processing packets in a cable modem (hereinafter, referred to as "CM") which simultaneously receives the packets from a cable modem termination system (hereinafter, referred to as "CMTS") through a plurality of downstream channels in hybrid fiber coaxial networks.

This work was supported by the IT R&D program of MIC/ IITA. [2006-S-019-01, The Development of Digital Cable Transmission and Receive System for 1 Gbps Downstream]

BACKGROUND OF THE INVENTION

FIG. 1 shows a hybrid fiber coaxial network including a CMTS and a CM for simultaneously transmitting and receiving data, respectively, through four downstream channels. As shown in FIG. 1, a classifier 111 of a CMTS 110 classifies packets received from a network-side interface (hereinafter, referred to as "NSI") 140 into packets 115 for which resequencing is not necessary (hereinafter, referred to as "ordinary packets") and packets 116 for which resequencing is necessary (hereinafter, referred to as "resequencing packets"). Among the classified packets, the ordinary packets 115 are transmitted to one or all of four schedulers 113. Whereas, the resequencing packets 116 are transmitted to a sequencer/distributor 112 and assigned numbers according to a resequence order. The resequencing packets 116 are then distributed to the four schedulers 113 in a specific manner.

Each scheduler 113 of the CMTS 110 receives the ordinary packets 115 or the resequencing packets 116 and transmits them to a CM 120 through one of the four downstream channels 114 based on a scheduling algorithm. The CM 120 processes the received packets and transmits them to a customer premises equipment (hereinafter, referred to as "CPE") 130.

The CM 120 in a hybrid fiber coaxial network structure receives the ordinary packets 115, which are transmitted through a single downstream channel 114, and the resequencing packets 116, which are transmitted through two to four downstream channels 114. Therefore, the CM 120 is required to simultaneously process the ordinary packets 115 and the resequencing packets 116. In particular, since the resequencing packets 116 are distributed to two to four downstream channels 114 by the CMTS 110 to be transmitted therethrough, a receiving order of the packets at the CM 120 can be made to be different from a transmitting order thereof at the NSI 140 depending on settings of each scheduler 113 of the downstream channels 114 and each downstream channel 114. Therefore, in order to output the received resequencing packets in the same order as the input order from the NSI 140 to the CMTS 110, the CM 120 performs a packet resequencing process before transmission to the CPE 130.

The CMTS 110 transmits a downstream service identifier encoding information (hereinafter, referred to as "DSID"), which is necessary information for the CM 120 to process the ordinary packets 115 and the resequencing packets 116, to the CM 120 in the initialization process, and thereafter transmits the packets into which the DSID is inserted. When transmitting the resequencing packet the CMTS 110 inserts also a packet sequence number (hereinafter, referred to as "PSN") for use in resequencing into the packet. The CM 120 processes downstream packets by using control information received from the CMTS 110 and information included in the packets.

The DSID encoding information that is transmitted from the CMTS 110 to the CM 120 in the initialization process includes individual DSID information to be received and processed by the CM 120; operation information for the DSID information; and information for use in identifying the ordinary packet and the resequencing packet. Particularly, the DSID of the resequencing packet further includes downstream resequencing channel list information and resequencing waiting time information.

FIGS. 2A to 2D show various formats of packets transmitted from the CMTS 110 to CM 120.

A first packet 201 is an ordinary unicast packet having no traffic priority. As shown in FIG. 2A, the packet 201 is formed of a MAC header 210 and a MAC data 220, wherein the MAC header 210 includes a frame control field (hereinafter, referred to as "FC") 211 for indicating a packet type and existence of an extended header, a MAC parameter field (hereinafter, referred to as "MAC_PARM") 212 for indicating a length of the extended header, a length field (hereinafter, referred to as "LEN") 213 for indicating a total length of the packet, and a header check sequence field (hereinafter, referred to as "HCS") for use in error checking of the MAC header 210.

A second packet 202 is an ordinary unicast packet having a traffic priority. As shown in FIG. 2B, the packet 202 additionally includes an extended MAC header field (hereinafter, referred to as "EHDR") 215, wherein the EHDR 215 has traffic priority information indicating a traffic priority of the packet.

A third packet 203 is an ordinary multicast packet. As shown in FIG. 2C, the packet 203 additionally includes an EHDR 216. In comparison with the EHDR 215 of the unicast packet 202, the EHDR 216 of the multicast packet 203 additionally has DSID information for use in identifying the multicast packet 203.

A fourth packet 204 shown in FIG. 2D is a resequencing unicast/multicast packet. The packet 204 is formed by adding an EHDR 217 to the ordinary unicast packet 201, wherein, compared with the EHDR 216 of the ordinary multicast packet 203, the EHDR 217 additionally has a sequence change counter (hereinafter, referred to as "SCC") value and PSN information in which enable a resequencing process.

The first to the third packets 201 to 203 are ordinary packets that is transmitted through a single channel, whereas the fourth packet 204 is the resequencing packet that is transmitted through a plurality of channels.

The CM 120 classifies such various types of packets into the ordinary packets and the resequencing packets based on their formats, and then processes and outputs them. In particular, in order to resequence the resequencing packets based on the PSN, the CM 120 needs to have a specific size of buffer for storing therein packets received from the CMTS 110 in the receiving order different from the transmitting order from the NSI 40 to the CMTS 110. Further, since the packets are outputted from an output end of the CM 120 one by one, a buffer space for temporarily storing therein the ordinary packets is also necessary.

As described above, since the CM 120 needs to store all the receiving packets, the size of the buffer required in the CM 120 depends on a packet arrival rate and a waiting time of the stored packet. Further, in case of separately providing a buffer for storing the ordinary packets and a buffer for storing the resequencing packets, there occurs a problem that the required buffer size increases significantly.

SUMMARY OF THE INVENTION

It is, therefore, an object of the present invention to provide an apparatus and a method for integratedly processing packets for which resequecing is necessary and packets for which resequencing is not necessary, so that the buffer size required in a cable modem of a hybrid fiber coaxial network can be minimized and the packet loss caused by the buffer overflow can be prevented.

It is another object of the present invention to provide an input controller for classifying and storing input packets depending on whether resequencing is required and an output controller for outputting the packets according to the output rate of a CM while taking the priority of the packets into consideration.

It is still another object of the present invention to provide a data structure for resequencing, configure a timer controller for controlling a storing time of the resequencing packets, and provide a method for rapidly detecting the loss of the resequencing packets.

In accordance with an aspect of the present invention, there is provided a packet processing apparatus of a cable modem in hybrid fiber coaxial networks for processing a packet received from a cable modem termination system through a plurality of downstream channels, wherein a specific channel number is assigned to each channel and the cable modem termination system transmits downstream service identifier encoding information to the cable modem during an initializing process therebetween, the apparatus including:

a plurality of channel receivers, each for generating an interface packet by inserting the channel number of a corresponding channel into the packet received through the corresponding channel; and an input controller that classifies the interface packet into a resequencing packet, which needs to be resequenced, and an ordinary packet, for which resequencing is not necessary, using the downstream service identifier encoding information and stores the resequencing packet and the ordinary packet.

In accordance with another aspect of the present invention, there is provided a packet processing method of a cable modem in a hybrid fiber coaxial networks for processing a packet received from a cable modem termination system through a plurality of downstream channels, wherein a specific channel number is assigned to each channel and the cable modem termination system transmits downstream service identifier encoding information to the cable modem during an initializing process therebetween, the method including:

generating an interface packet by inserting the channel number of a corresponding channel into the packet received through the corresponding channel;

classifying the interface packet into a resequencing packet, which needs to be resequenced, and an ordinary packet, for which resequencing is not necessary, using the downstream service identifier encoding information;

storing the resequencing packet and the ordinary packet in a packet buffer; and separately storing information on the resequencing and ordinary packets, which have been stored in the packet buffer.

In accordance with the present invention, the CM is configured to have a packet input part and a packet output part separately. The packet input part simultaneously receives packets through a plurality of channels and classifies the packets into the ordinary packets and the resequencing packets according to the DSIDs in the packets, thus storing the packets in packet buffers. The packet output part outputs the packets stored in the packet buffers according to the traffic priority. When needed, the packet output part resequences the packets before outputting them. Therefore, the size of the packet buffer can be minimized and packet loss can be avoided while satisfying requirements for packet processing.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art. First, an internal configuration of a CM device in accordance with the present invention and a data structure supporting an operation of each component will be explained. Further, a method for inputting, processing and outputting packets by employing the configuration will be explained.

Figure 1:
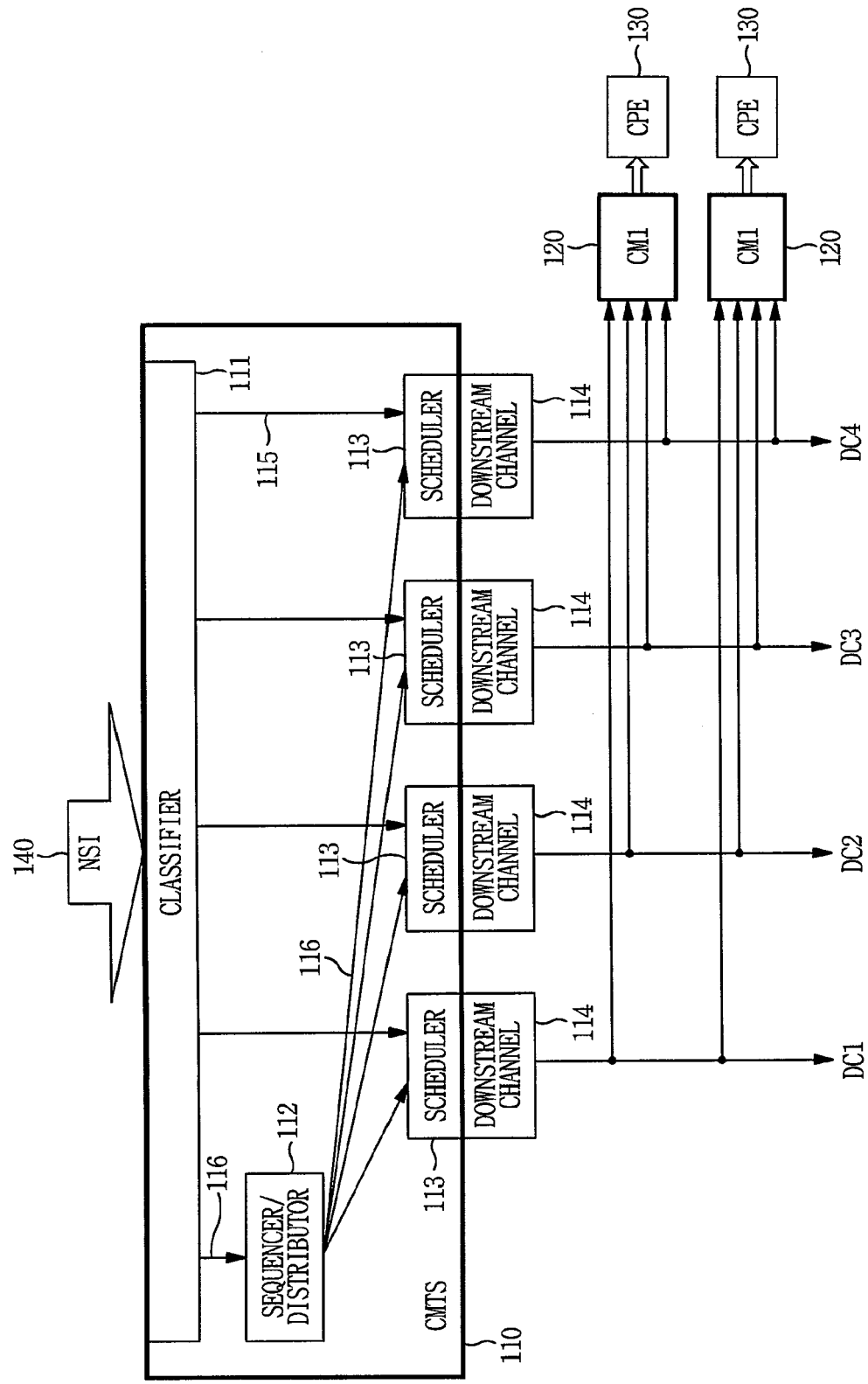
FIG. 1 shows a conventional hybrid fiber coaxial network including a CMTS and a CM for simultaneously transmitting and receiving data, respectively, through a plurality of downstream channels.
Figure 2A:
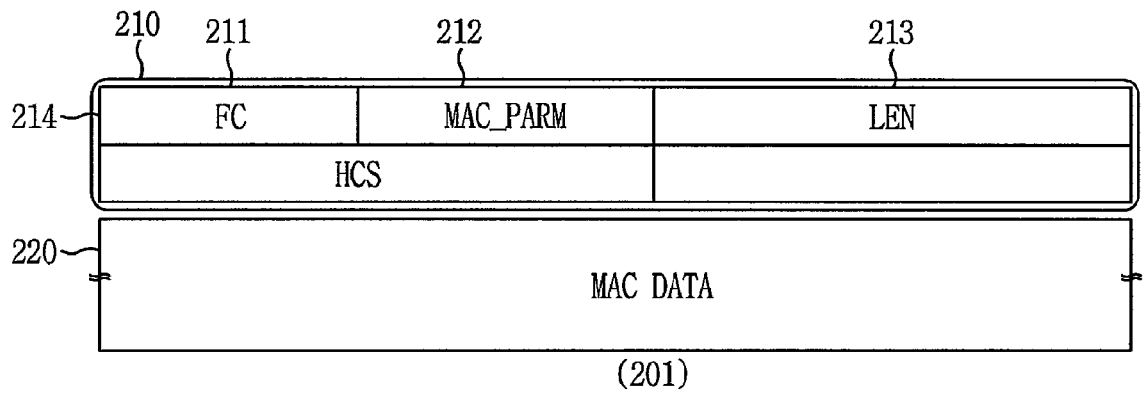
FIGS. 2A to 2D illustrate formats of downstream packets transmitted from the CMTS to the CM.
Figure 2B:
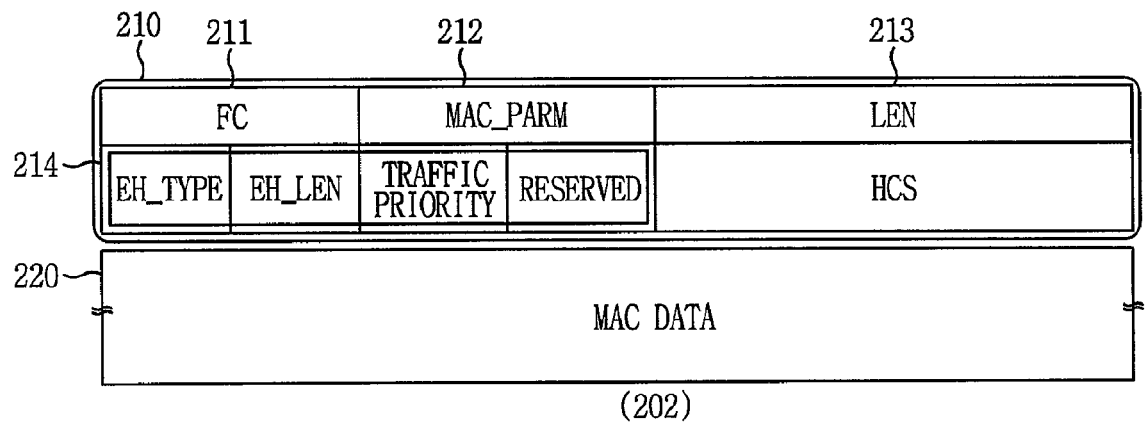
Figure 2C:
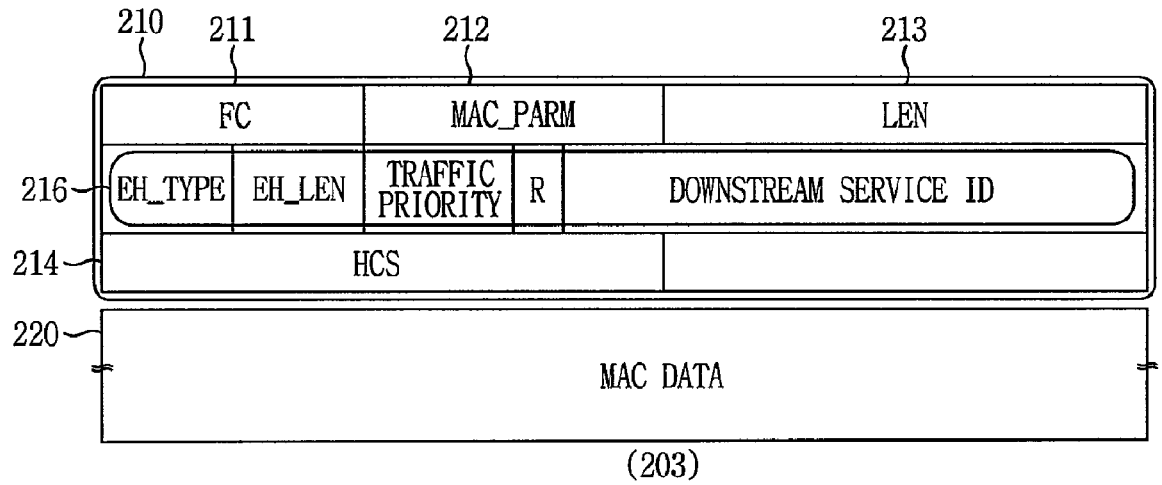
Figure 2D:
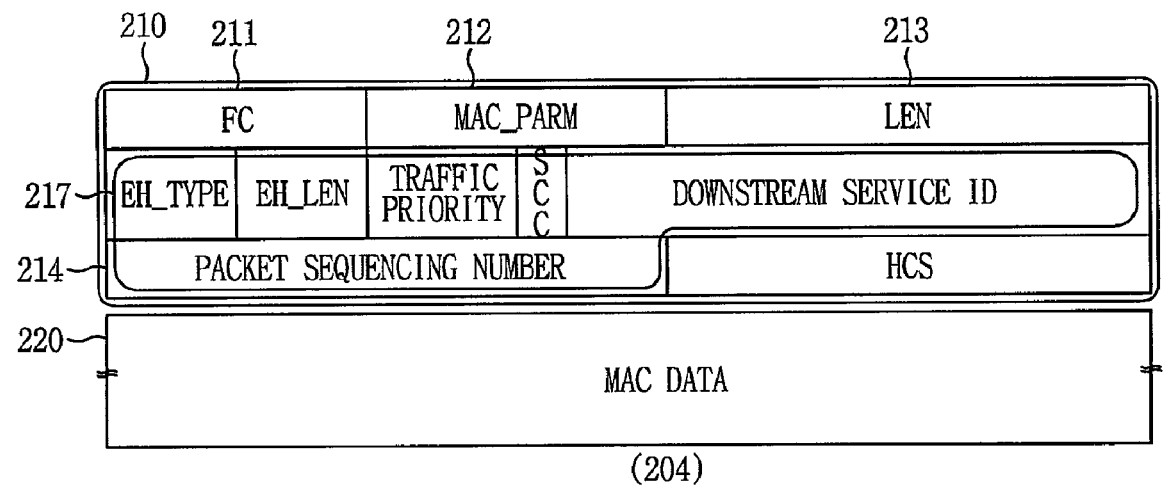
Figure 3:
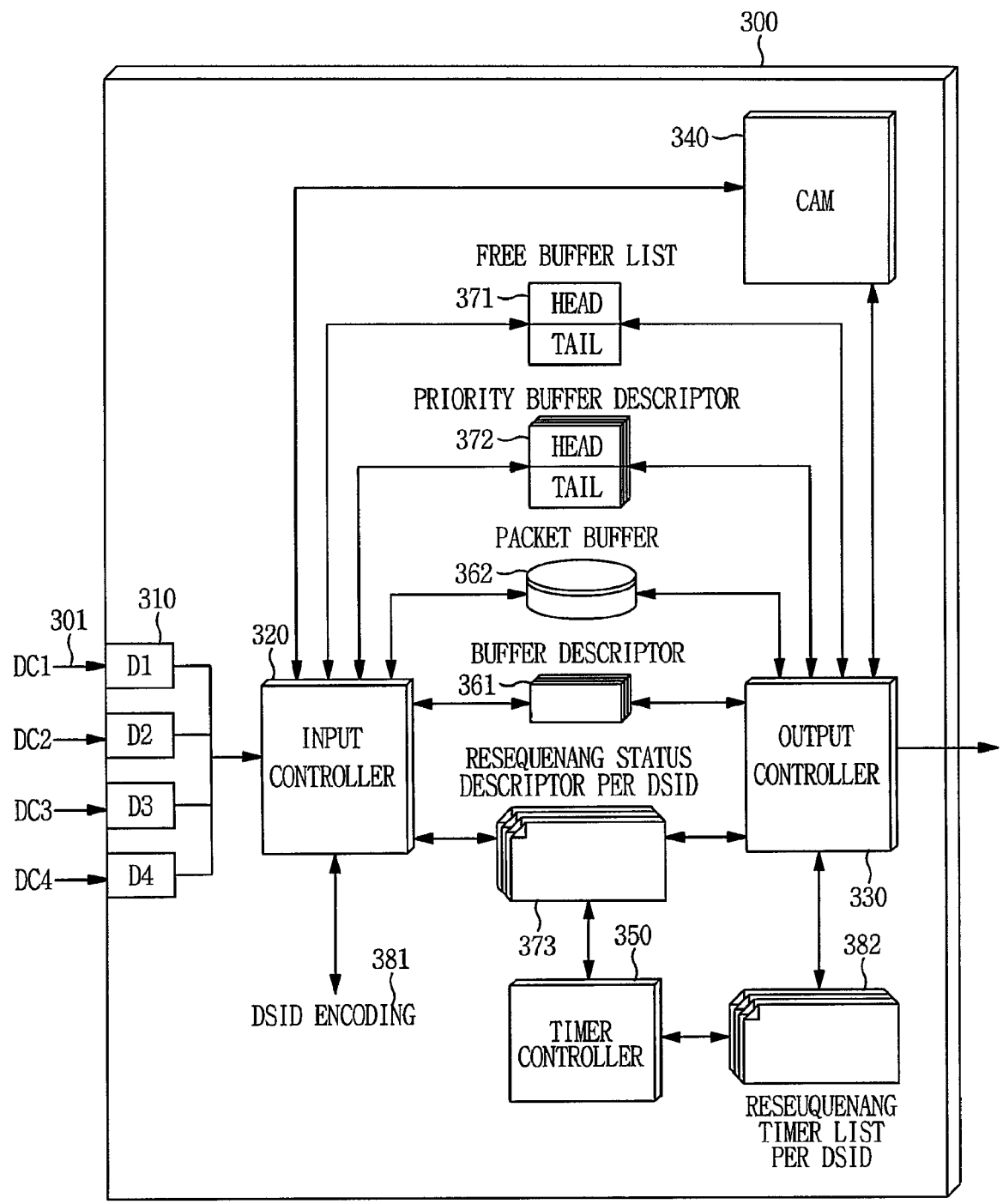
FIG. 3 shows a configuration of a CM in accordance with the present invention, which receives packets through a plurality of downstream channels and processes the packets.

FIG. 3 shows an internal configuration of a CM 300 in accordance with the present invention, wherein the CM 300 receives and processes packets through a plurality of downstream channels. As shown in FIG. 3, the CM 300 includes four channel receivers 310 for generating a PHY-MAC interface packet 400 shown in FIG. 4 by extracting a MAC frame from analog signals received through four downstream channels 301 and inserting a receive channel number therein. The output PHY-MAC interface packet 400 is stored in a packet buffer 362 through an input controller 320, while the packet stored in the packet buffer 362 is outputted to a CPE through an output controller 330.

Meanwhile, a buffer descriptor 361 records information on each packet stored in the packet buffer 362. The CM 300 further includes a free buffer list 371 for indicating a packet buffer capable of storing therein packets; a priority buffer descriptor 372 for indicating a packet buffer storing therein packets for which resequencing is not necessary; a resequencing status descriptor 373 for indicating a packet buffer where packets which need resequencing are stored and describing a resequencing status thereof; a CAM (Content Addressable Memory) 340 for use in searching for a packet buffer in which a specific packet is stored; a resequencing timer list 382 for recording an input time of a specific packet among the packets which need resequencing stored in the packet buffer 362; and a timer controller 350 for checking a timeout of the packets recorded in the resequencing timer list 382. FIG. 3 exemplifies eight priority buffer descriptors 372 and sixteen resequencing status descriptors 373.

Figure 4:
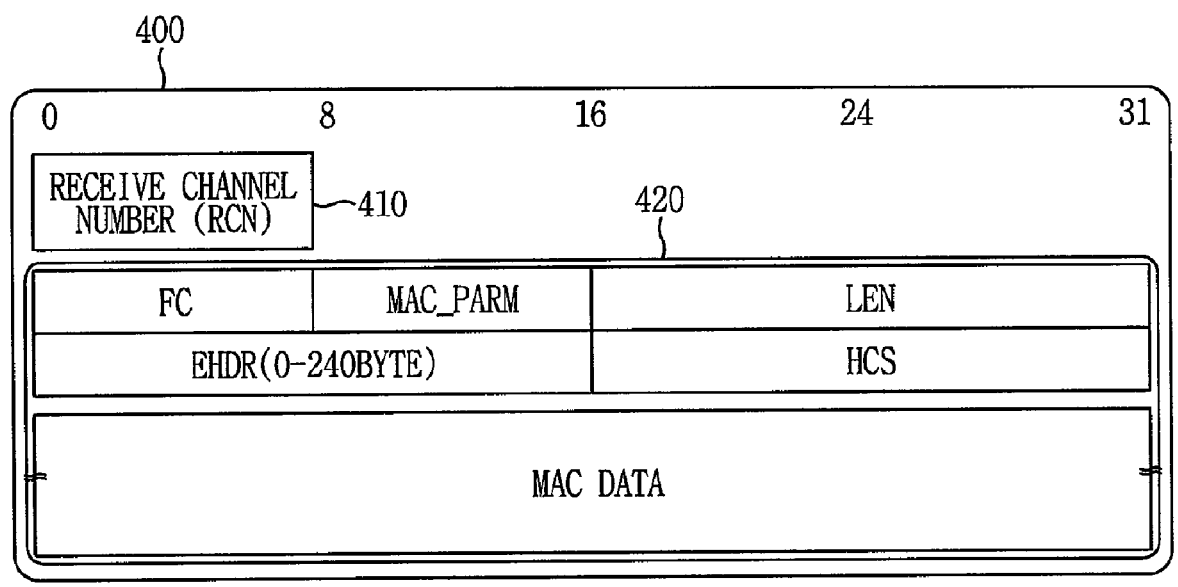
FIG. 4 depicts a format of a PHY-MAC interface packet transmitted from a channel receiver to an input controller.

FIG. 4 depicts a format of the PHY-MAC interface packet 400 transmitted from each channel receiver 310 to the input controller 320. As shown in FIG. 4, the PHY-MAC interface packet 400 generated by the channel receiver 310 has a 1-byte receive channel number (hereinafter, referred to as "RCN") 410 which is inserted before a MAC frame 420 extracted from the analog signals.

Figure 5:
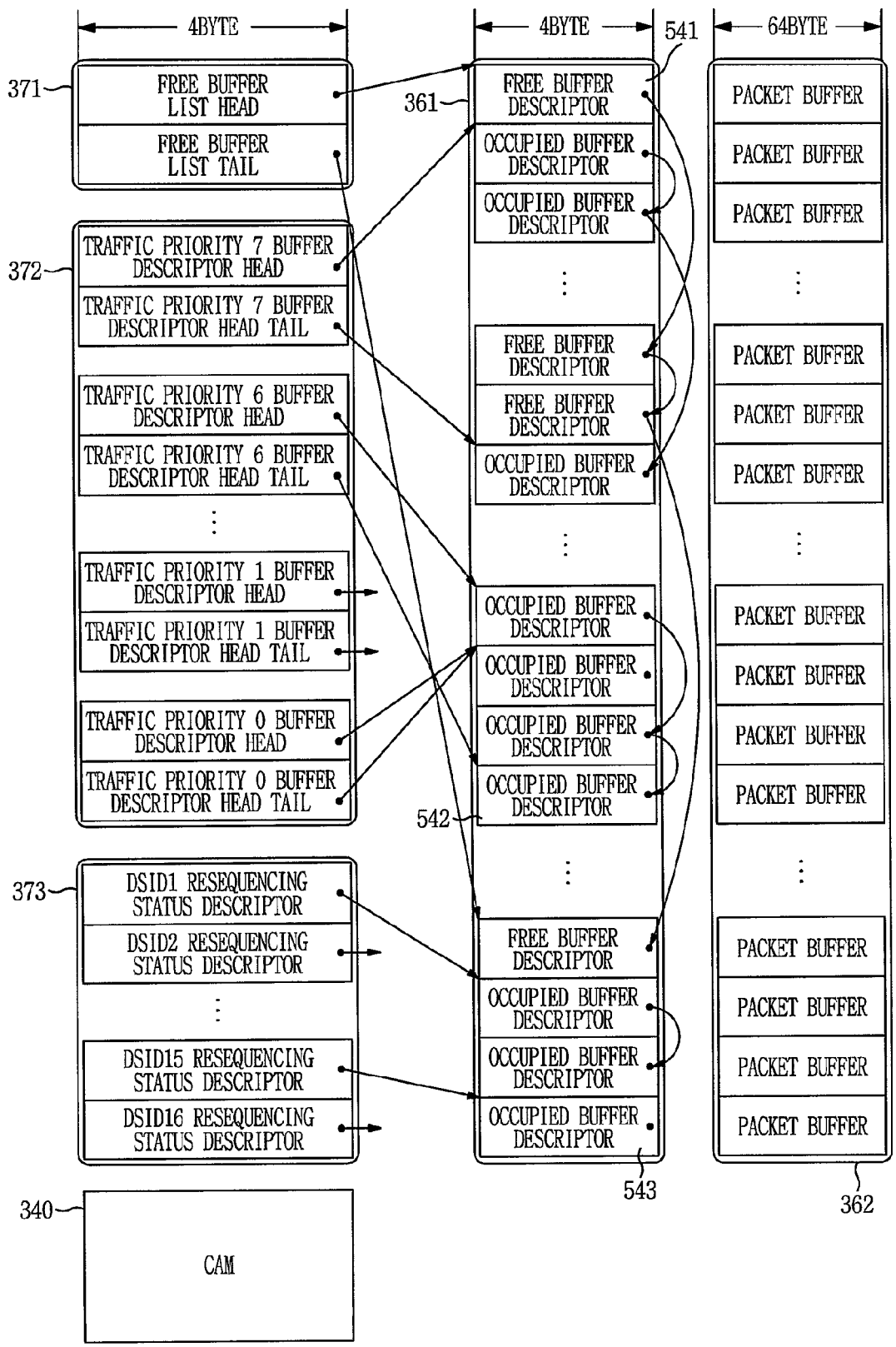
FIG. 5 schematically illustrates operational relationship among a buffer descriptor, a packet buffer, a free buffer list, a priority buffer descriptor, a resequencing status descriptor and a CAM (Content Addressable Memory) which operate in storing input packets.

FIG. 5 schematically illustrates a connection relationship among the buffer descriptor 361, the packet buffer 362, the free buffer list 371, the priority buffer descriptor 372, the resequencing status descriptor 373 and the CAM 340 of FIG. 3. As shown in FIG. 5, the buffer descriptor 361 and the packet buffer 362 are in one-to-one correspondence. Each buffer descriptor 361 can be classified into a free buffer descriptor 541 and an occupied buffer descriptor 542 or 543 based on use of the corresponding packet buffer 362. The free buffer list 371 points to the free buffer descriptor 541, whereas the priority buffer descriptor 372, the resequencing status descriptor 373 and the CAM 340 point to the occupied buffer descriptor 542 or 543. Further, the packet buffer 362 is a particle buffer whose size is adjustable by a user. That is, if the size of a packet is larger than that of a single packet buffer 362, the packet is divided and stored in a plurality of packet buffers 362, and information of the packet stored in each of the packet buffers 362 is recorded in the buffer descriptor 361.

FIGS. 6A to 6E respectively present an internal configuration of the free buffer list 371, the priority buffer descriptor 372, the free buffer descriptor 541, the occupied buffer descriptor 542 or 543, and the resequencing status descriptor 373 of FIG. 5.

Figure 6A:
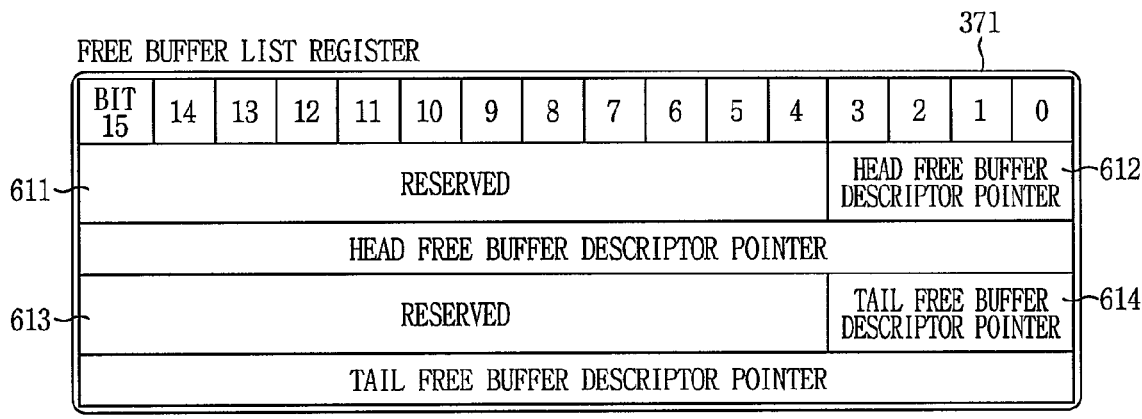
FIGS. 6A to 6E respectively present components of the free buffer list, the priority buffer descriptor, the free buffer descriptor, an occupied buffer descriptor, and the resequencing status descriptor in accordance with the present invention.

The free buffer list 371 shown in FIG. 6A includes a 12-bit reserved field 611; a 16-bit head free buffer descriptor pointer 612 indicating the buffer descriptor corresponding to the foremost packet buffer among the packet buffers pointed by the free buffer list 371; a 12-bit reserved field 613; and a 16-bit tail free buffer descriptor pointer 614 indicating the buffer descriptor corresponding to the last packet buffer among the packet buffers pointed by the free buffer list 371.

Figure 6B:
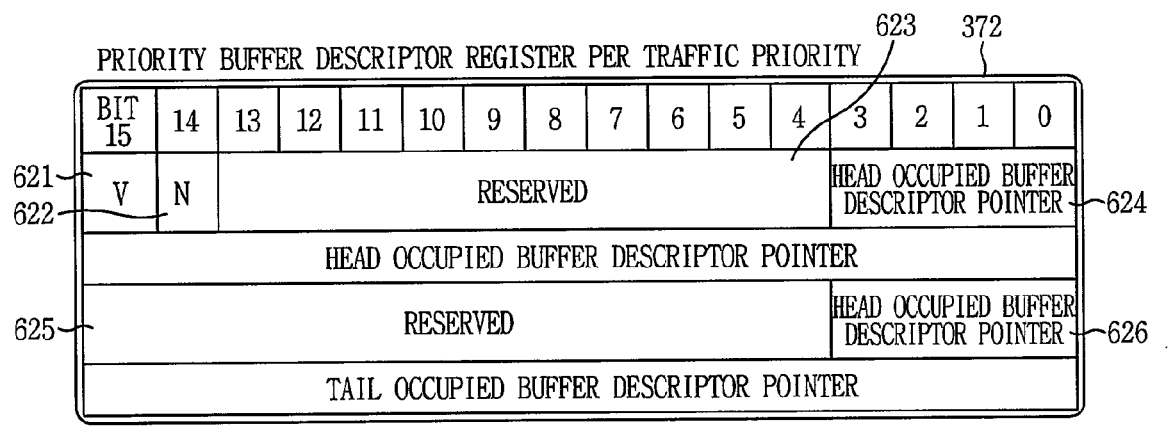

The priority buffer descriptor 372 shown in FIG. 6B includes a 1-bit valid output field 621 representing an output-ready status; a 1-bit null field 622 representing an empty status of the priority buffer descriptor 372; a 10-bit reserved field 623; a 16-bit head occupied buffer descriptor pointer 624 indicating the buffer descriptor corresponding to the foremost packet buffer among the packet buffers pointed by the priority buffer descriptor 372; a 12-bit reserved field 625; and a 16-bit tail occupied buffer descriptor pointer 626 representing the buffer descriptor corresponding to the last packet buffer among the packet buffers pointed by the priority buffer descriptor 372.

Figure 6C:
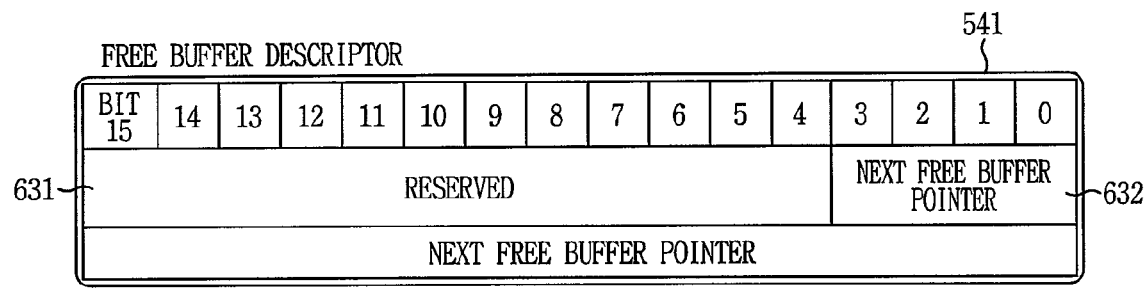

FIG. 6C illustrates the free buffer descriptor 541 among the buffer descriptors 361 of FIG. 5. The free buffer descriptor 541 shown in FIG. 6C includes a 16-bit reserved field 631 and a next free buffer pointer 632 indicating the free buffer descriptor corresponding to the next packet buffer capable of storing packets.

Figure 6D:
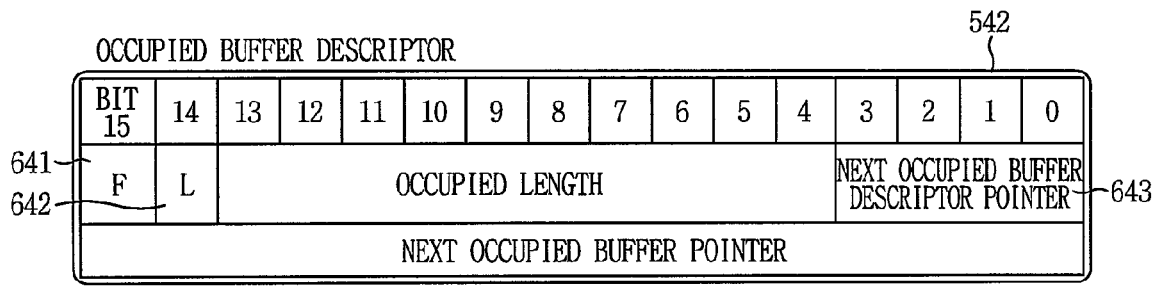

FIG. 6D shows the occupied buffer descriptor 542 or 543 among the buffer descriptors 361 of FIG. 5. As shown in FIG. 6D, the occupied buffer descriptor 542 includes a 1-bit first packet field (hereinafter, referred to as "F") 641 representing that the foremost part of the packet is stored in the corresponding packet buffer; a 1-bit last packet field (hereinafter, referred to as "L") 642 representing that the last part of the packet is stored in the corresponding packet buffer; a 10-bit occupied length field representing the length of the packet stored in the corresponding packet buffer; and a next occupied buffer descriptor pointer 643 indicating the occupied buffer descriptor corresponding to the packet buffer storing therein the next part of the packet.

Figure 6E:
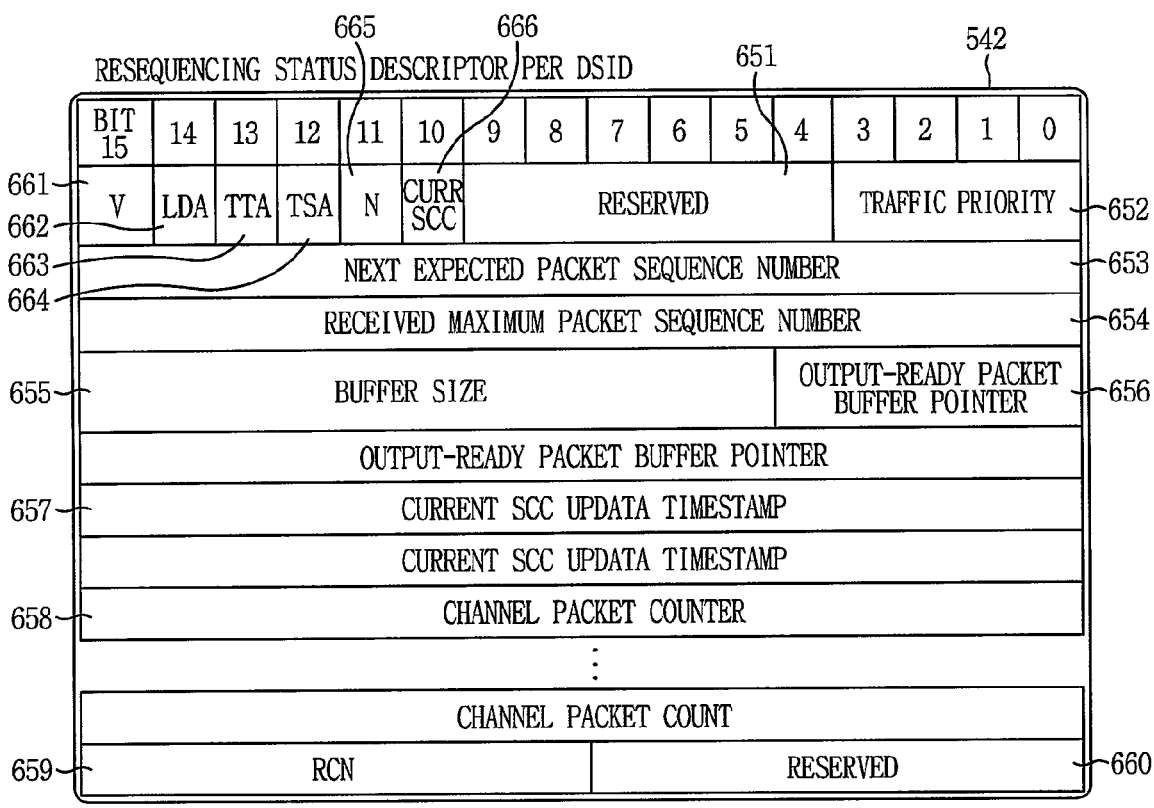

FIG. 6E shows a configuration of the resequencing status descriptor 373. The resequencing status descriptor 373 includes a 1-bit valid output field (hereinafter, referred to as "V") 661 representing an output-ready status; a 1-bit rapid loss detection active field (hereinafter, referred to as "LDA") 662 representing the detection of the loss of the packet which needs resequencing; a 1-bit triggering timeout active field (hereinafter, referred to as "TTA") 663 indicating a timeout of the packets which need resequencing stored in the packet buffer; a triggering SCC active field (hereinafter, referred to as "TSA") 664 indicating the initial status of the packet sequence number (hereinafter, referred to as "PSN"); a 1-bit null field (hereinafter, referred to as "N") 665 indicating a null packet; and a 1-bit current sequence change counter field (hereinafter, referred to as "current SCC") 666 indicating the sequence change counter value of the currently processing packets.

The resequencing status descriptor 373 further includes a 7-bit reserved field 651; a 3-bit traffic priority field 652 indicating a priority of the packet; a 16-bit next expected packet sequence number field (hereinafter, referred to as "NEPSN")

653 representing a PSN of the next output packet; a 16-bit received maximum packet sequence number field (hereinafter, referred to as "RMPSN") 654 indicating the maximum PSN among the PSNs of the packets stored in the packet buffer; a 12-bit buffer size field 655 indicating the size of the buffer capable of storing packets; a 20-bit output-ready packet buffer pointer field 656 pointing to the occupied buffer descriptor corresponding to the packet buffer in which an output-ready resequencing packet is stored; a 32-bit current SCC update timestamp field 657 representing a changing time to the current SCC; a 16-bit channel packet counter field (hereinafter, referred to as "CPC") 658 representing the number of the stored packet received through each channel; a 8-bit receive channel number field (hereinafter, referred to as "RCN") 659 representing channel information through which the packet is received; and a 8-bit reserved field 660.

Figure 7A:
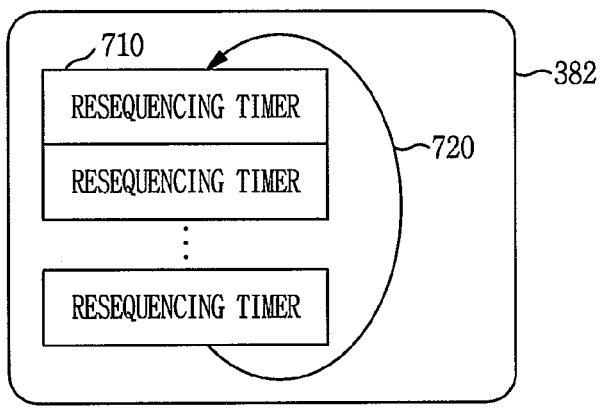
FIGS. 7A and 7B respectively illustrate a schematic configuration of a resequencing timer list for use in checking a timeout of stored packets and components of a resequencing timer.
Figure 7B:
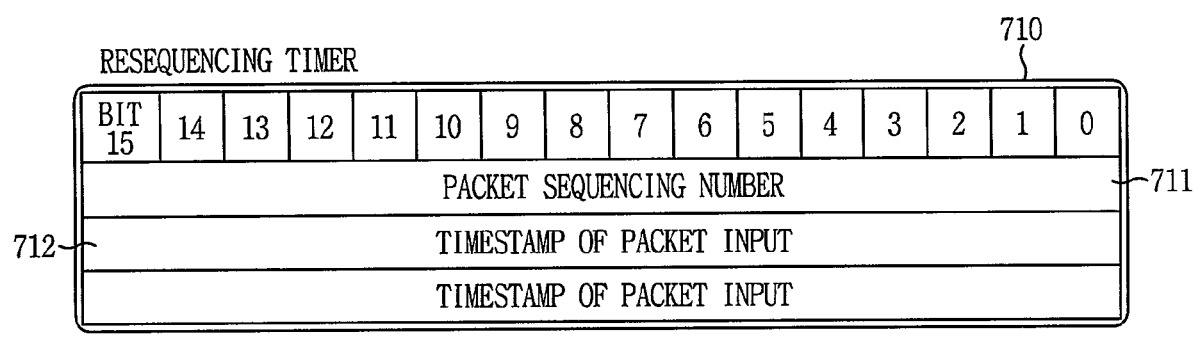

FIGS. 7A and 7B illustrate a schematic configuration of the resequencing timer list 382 of FIG. 3 and an internal configuration thereof, respectively.

As shown in FIG. 7A, the resequencing timer list 382 is separately generated for every DSID, and each resequencing timer list 382 has a plurality of resequencing timers 710 stored in a circular queue 720.

FIG. 7B shows an internal format of the resequencing timer 710. The resequencing timer 710 includes a 16-bit PSN field 711 representing the PSN of the packet which is timestamped and stored, and a 32-bit timestamp of packet input field 712 representing an input time of the packet.

Figure 8:
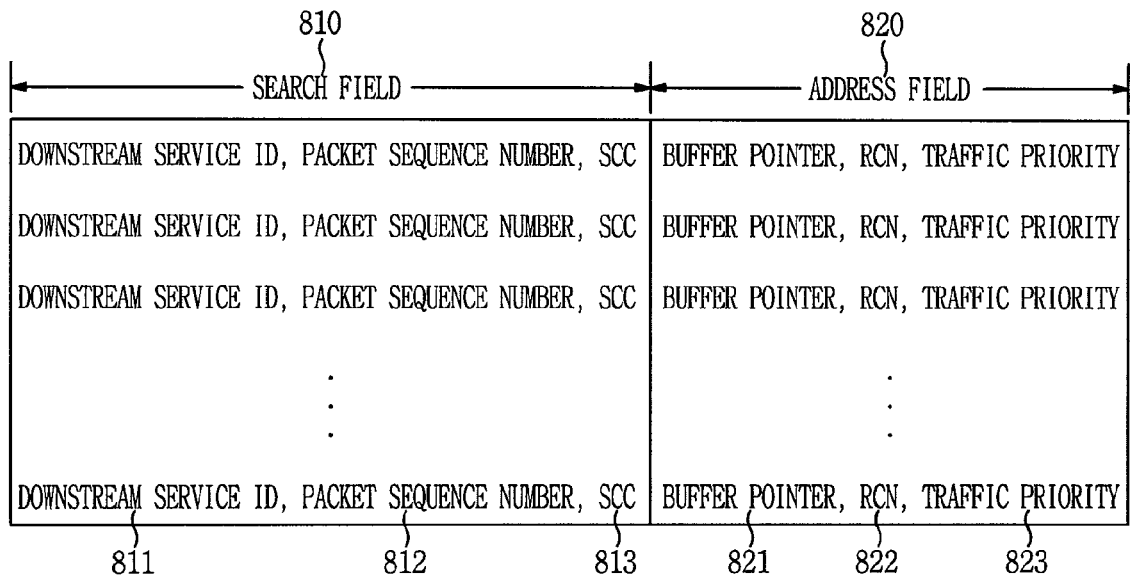
FIG. 8 illustrates configuration of the CAM for use in searching for a packet buffer in which a specific packet is stored.

FIG. 8 shows a configuration of the CAM 340 of FIG. 3. As shown in FIG. 8, the CAM 340 includes a search field 810 for use in searching for a specific packet and an address field 820 indicating the occupied buffer descriptor 361 corresponding to the packet buffer 362 in which the packet is stored. The search field 810 has a DSID 811, a PSN 812 and a SCC 813 which are information necessary for searching for the specific packet stored in the packet buffer 362. The address field 820 has a buffer pointer 821 of the occupied buffer descriptor 361 corresponding to the packet buffer 362 in which the specific packet is stored, a RCN 822 of the stored packet, and a traffic priority 823.

Next, there will be described a method for inputting, processing and outputting the packets by using the CM device having a configuration as described above. As described above, the four channel receivers extract a MAC frame from the analog signals received through the four downstream channels. Further, the channel receivers generate the PHY-MAC interface packet by inserting 1-byte receive channel number information before the extracted MAC frame, and then transmits the PHY-MAC interface packet to the input controller.

Figure 9:
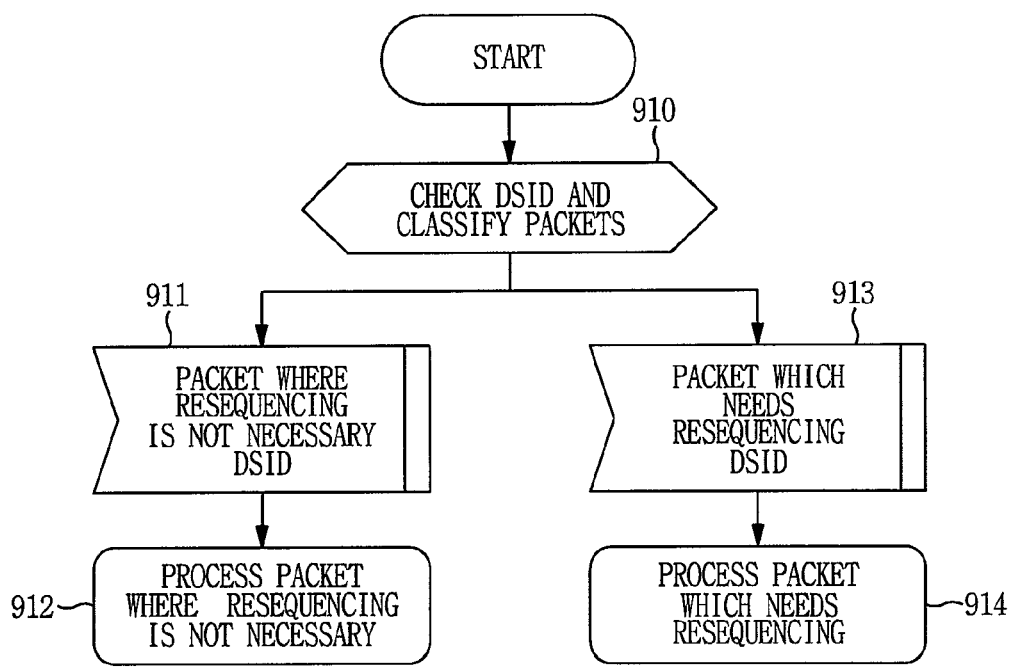
FIG. 9 is a flow chart for describing a method for classifying the input packets in accordance with the present invention, wherein the input packets are classified into ordinary packets for which resequencing is not necessary and resequencing packets.

FIG. 9 illustrates a step-by-step process for processing the PHY-MAC interface packet in the input controller. In step 910, the input controller classifies the input PHY-MAC interface packets into the packets 911 for which resequencing is not necessary and the packets 913 which need resequencing by comparing the internal information of the input PHY-MAC interface packets and the DSID encoding information transmitted from the CMTS. Step 912 is performed on the packets 911 for which resequencing is not necessary, whereas step 914 is performed on the packets 913 which need resequencing.

Figure 10:
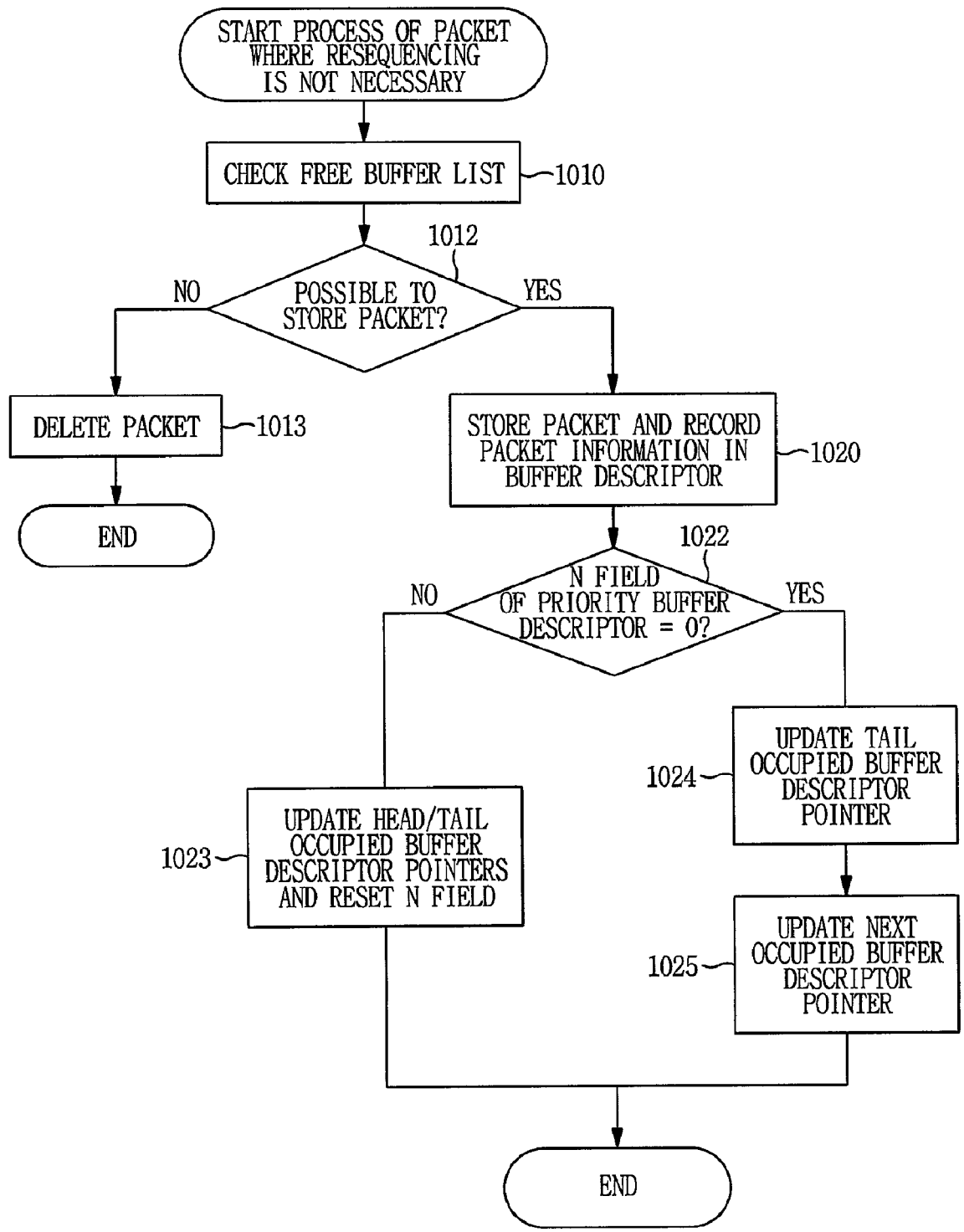
FIG. 10 illustrates a flow chart for explaining a method for storing the ordinary packet for which resequencing is not necessary in the packet buffer.

FIG. 10 illustrates an input and storing process of the ordinary packets for which resequencing is not necessary in detail. As shown in FIG. 10, if a packet is classified into the packets for which resequencing is not necessary, the free buffer list will be first checked in step 1010, and then it will be determined whether it is possible to store the packet in step 1011. If it is not possible to store the packet, the packet will be deleted in step 1013, thereby terminating the process. In contrast, if it is possible to store the packet, the packet will be stored in the packet buffer and the information of the stored packet is recorded in the buffer descriptor in step 1020. At this time, if the packet does not include the traffic priority information, the traffic priority value will be recorded as zero.

In the following step 1022, the priority information of the packet is extracted and the N field of the corresponding priority buffer descriptor is checked. If the N field is set to be zero, in steps 1024 and 1025, the tail occupied buffer descriptor pointer value of the priority buffer descriptor and the next occupied buffer descriptor pointer value of the occupied buffer descriptor recorded in the before-change tail occupied buffer descriptor pointer will be updated to the address value of the occupied buffer descriptor corresponding to the packet buffer in which the packet has been stored last, and then the process will be terminated. On the contrary, if the N field is set to be one, in step 1023, the head occupied buffer descriptor pointer value of the priority buffer descriptor and the tail occupied buffer descriptor pointer value will be updated to the address value of the occupied buffer descriptor corresponding to the packet buffer in which the packet has been stored last, and the N field will be set as zero, thereby ending the packet inputting process.

Figure 11:
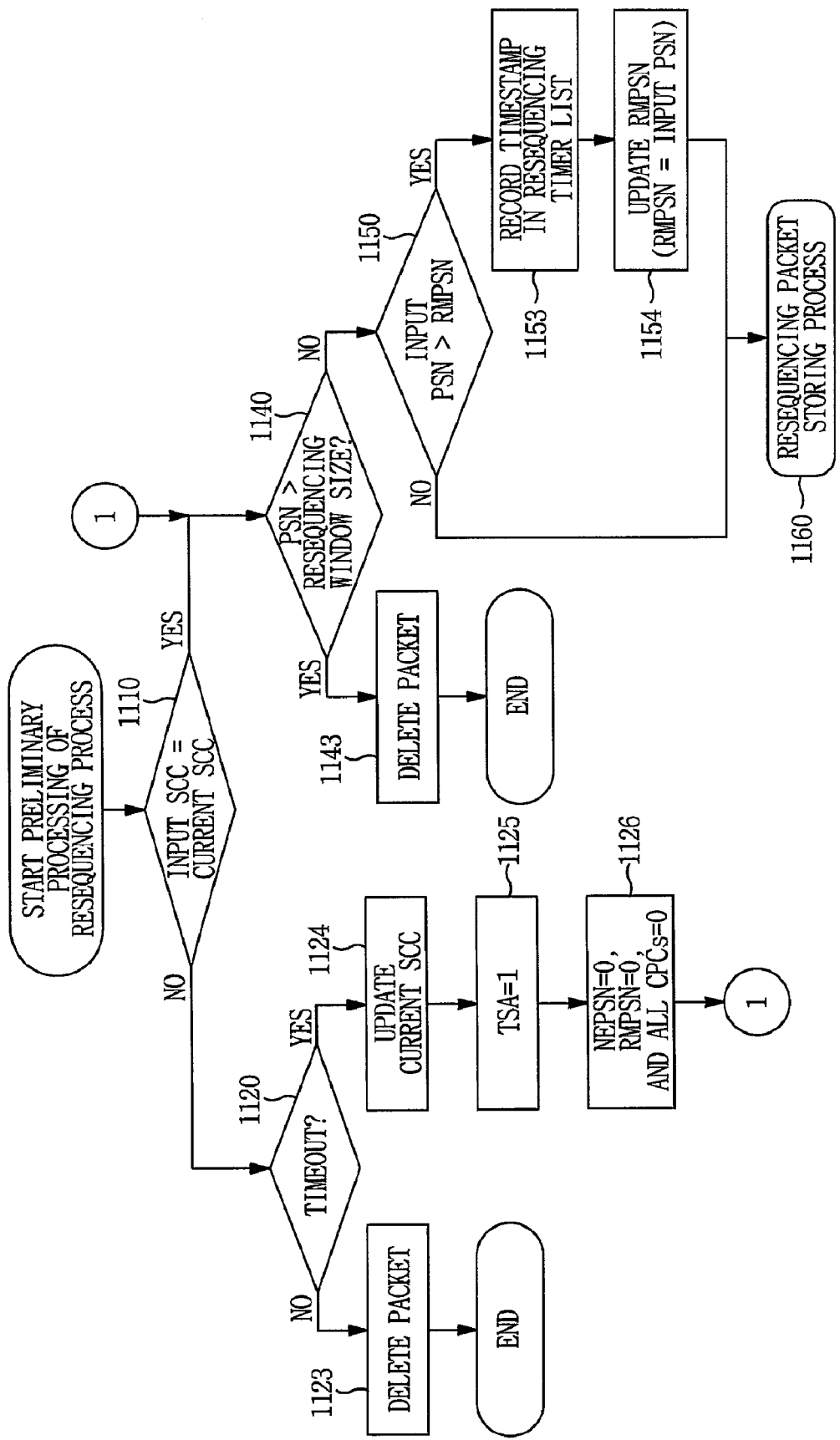
FIG. 11 provides a flow chart for describing a method for a resequencing packet pre-processing performed by the input controller when the resequencing packet is inputted.
Figure 12:
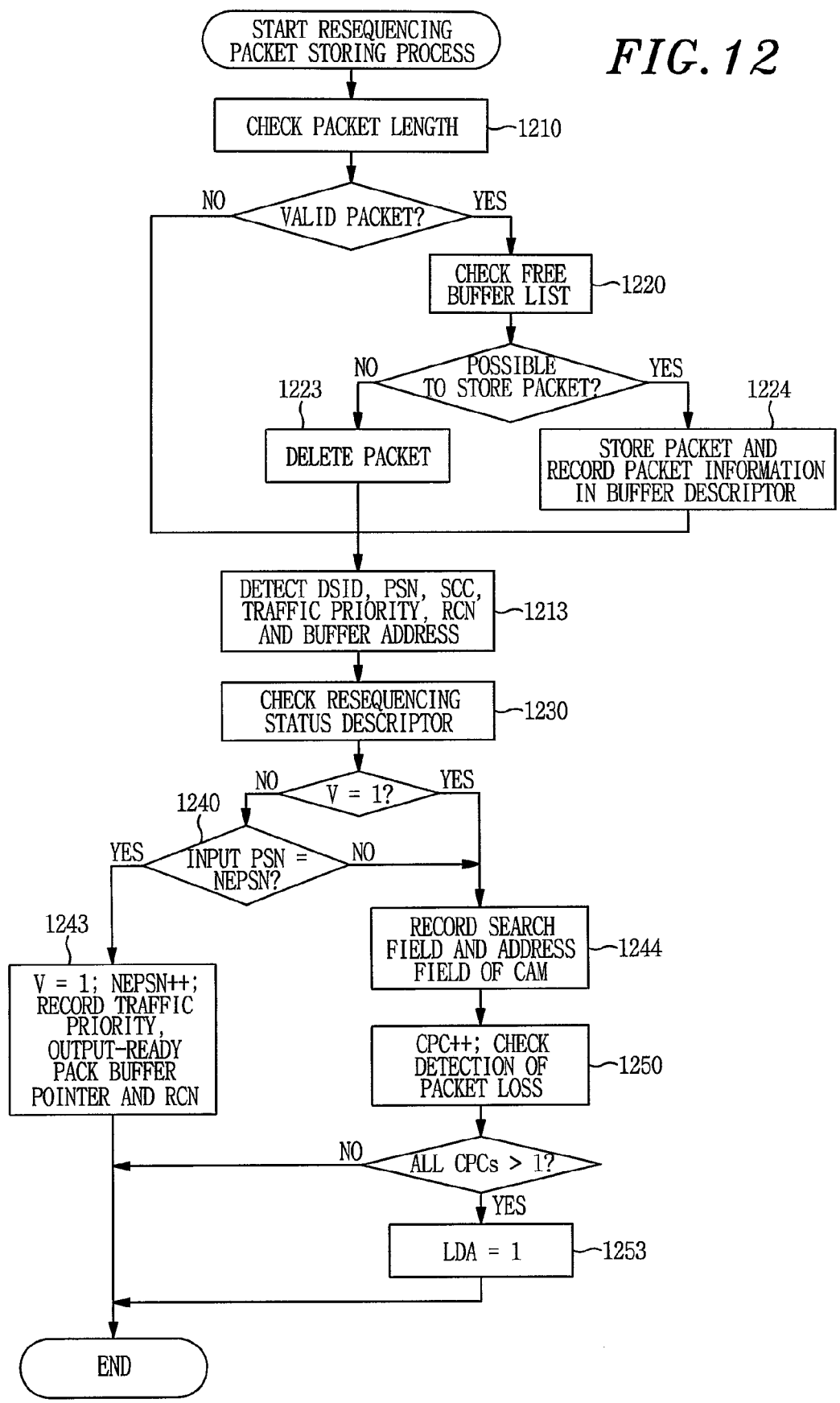
FIG. 12 presents a flow chart for describing a method for storing the resequencing packet in the packet buffer.

FIGS. 11 and 12 are flow charts describing an input and storing process of the packet which needs resequencing. The process of the packet which needs resequencing, i.e. the resequencing packet includes a preliminary process and a storing process.

FIG. 11 shows a preliminary process of the resequencing process for the packet which needs resequencing. In step 1110, the SCC field value of the input PHY-MAC interface packet and the 1-bit current SCC field value of the resequencing status descriptor are compared with each other. As a result of the comparison, if they are not identical, the current time and the 32-bit current SCC update timestamp field value of the resequencing status descriptor will be compared with each other to thereby determine a timeout in step 1120. At this time, if a difference therebetween is within one second, it will not be considered to be a timeout, and therefore, the input packet will be deleted in step 1123, thereby ending the process. However, if a difference therebetween is greater than one second, it will be considered to be a timeout, thus performing steps 1124 to 1126.

In the step 1124, the current SCC field value of the resequencing status descriptor is changed to be the SCC value of the input packet, and the current SCC update timestamp value is changed to be the current time. Further, in step 1125, the TSA field value of the resequencing status descriptor is changed to be one, and all bits in the NEPSN, the RMPSN, and the CPC field are initialized to be zero in step 1126. After that, a process performed when the comparison result of step 1110 is identical, which will be described below, is carried out.

In the meantime, as a result of the comparison of step 1110, if the SCC field value of the input packet and the current SCC field value of the resequencing status descriptor are identical, the PSN of the input packet will be compared to a resequencing window size, which is calculated by the sum of the NEPSN of the resequencing status descriptor and the buffer size, in step 1140. If the PSN of the input packet is greater than the resequencing window size, the input packet will be deleted in step 1143, thus ending the preliminary process. On the contrary, if the PSN is smaller than the resequencing window size, the PSN of the input packet and the RMPSN of the resequencing status descriptor will be compared with each other in step 1150. If the PSN of the input packet is greater than the RMPSN, the PSN and the current time will be recorded at the end of the resequencing timer list of the corresponding DSID in step 1153. After that, the RMPSN is updated to the PSN of the input packet in step 1154, and in the following step 1160, the packet storing process is performed. However, if the PSN of the input packet is smaller than the RMPSN, the packet storing process of step 1160 will be carried out without performing intermediate steps. The packet storing process of step 1160 is described in detail in FIG. 12.

The packet storing process shown in FIG. 12 starts with a packet length checking step of step 1210. In the step 1210, the length of the PHY-MAC interface packet is checked by using the LEN and MAC_PARM field of the MAC frame, and if the two field values are identical, the packet is a null packet. Otherwise, the packet is a valid packet. In case of the valid packet, the free buffer list will be checked in step 1220. Thereby, if it is not possible to store the packet, the packet will be deleted in step 1223, but if it is possible to store the packet, the packet will be stored in the packet buffer and the information of the stored packet is recorded in the buffer descriptor in step 1224. Next, in step 1213, the SCC, the DSID, the PSN and the like are extracted from the input packet in order to prepare the next steps.

In step 1230, the V field value of the resequencing status descriptor of the corresponding DSID is checked. If the V field is set to be zero, the PSN of the input packet and the NEPSN of the resequencing status descriptor of the corresponding DSID are compared with each other in step 1240. As a result of the comparison, if both values are identical, the V field value of the resequencing status descriptor of the corresponding DSID will be set as one and the NEPSN will be increased by one. Further, the address value of the occupied buffer descriptor corresponding to the packet buffer in which the packet has been stored will be recorded in the output-ready packet buffer pointer field, and the traffic priority and the RCN will be also recorded, thus ending the storing process.

In contrast, if the two values are not identical as a result of the comparison of the step 1240 or it is determined that the V field is set to be one in step 1230, the following process will be performed. That is, in step 1244, the SCC, the DSID, and the PSN extracted from the input packet are recorded in the search field of the CAM, while the address value of the occupied buffer descriptor corresponding to the packet buffer in which the packet is stored, the traffic priority, and the RCN value are recorded in the address field of the CAM.

After that, in step 1250, the CPC of the resequencing status descriptor corresponding to the RCN of the input packet is increased by one, and the packet loss detection is performed. The packet loss detection process of step the 1250 is performed by checking whether all the CPC field values of the resequencing status descriptor of the corresponding DSID are greater than zero. As a result of the packet loss detection carried out in this manner, if all the CPC field values are greater than zero, the LDA field will be set as one in step 1253, and then the packet storing process will end. However, if there is any CPC field value of zero, the process will end immediately.

So far, the input and the storing process of the PHY-MAC interface packet performed by the input controller has been described. Next, the output process of the packet performed by the output controller will be described.

Figure 13:
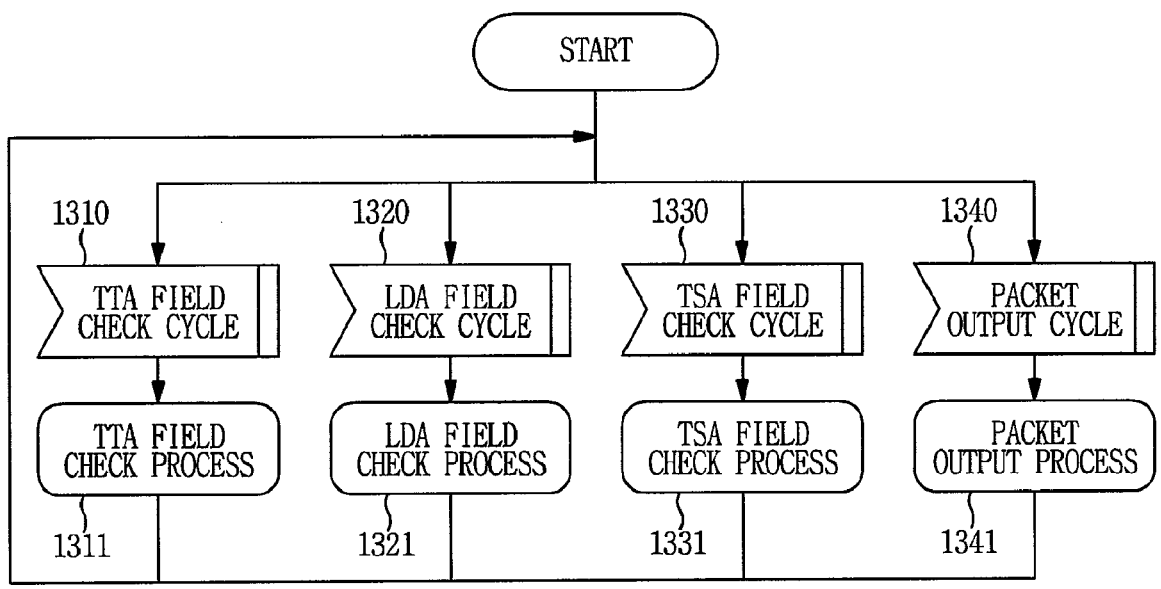
FIG. 13 represents a flow chart for explaining operations performed by an output controller according to an internal operation cycle.

FIG. 13 represents each operation cycle of the packet output process performed by the output controller. As shown in the drawing, the output controller operates in different ways according to four types of operation cycles of a TTA field check cycle 1310, a LDA field check cycle 1320, a TSA field check cycle 1330 and a packet output cycle 1340. Steps 1311, 1321, 1331 and 1341 shown in FIG. 13 are processes performed during the four types of the operation cycles and will be explained with reference to FIGS. 14 to 17, respectively.

Figure 14:
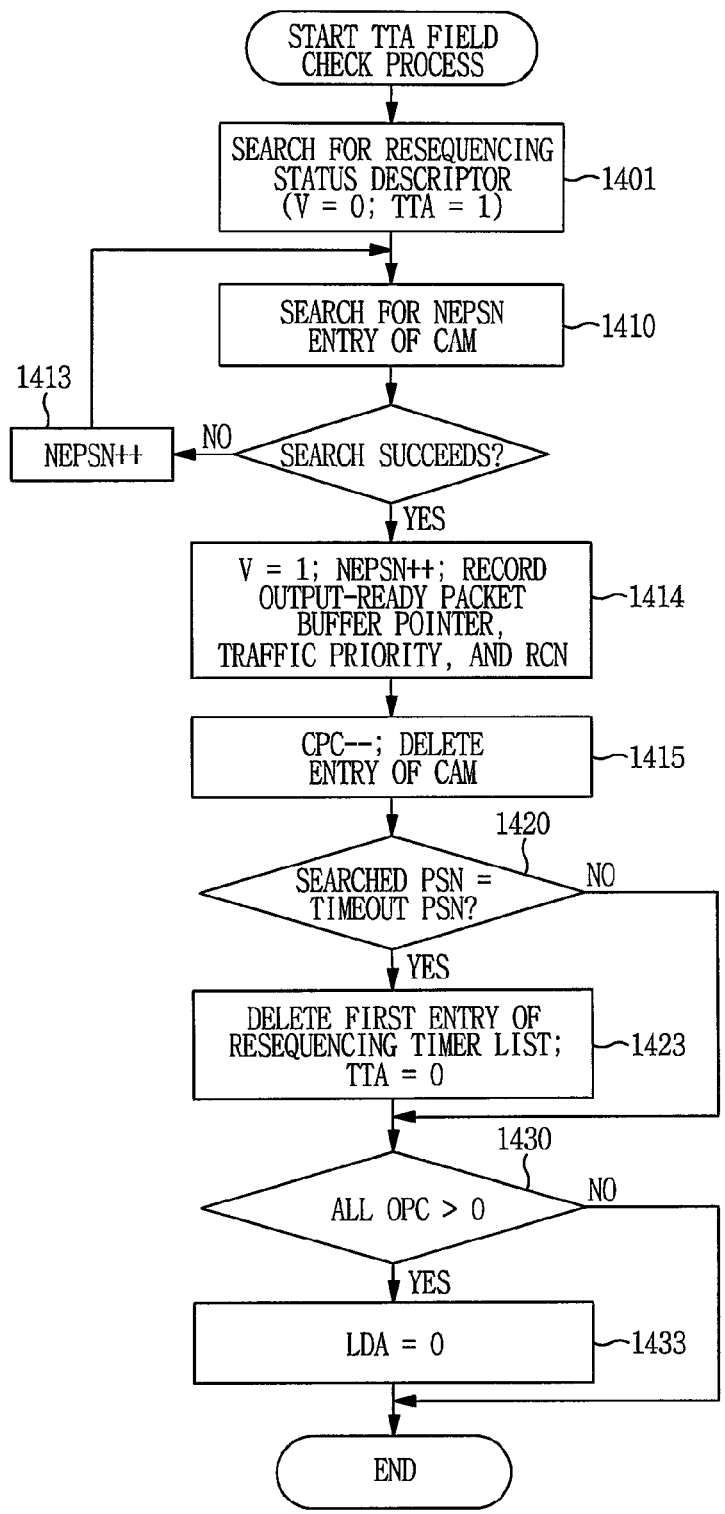
FIG. 14 describes a flow chart for illustrating a method for performing a resequencing process on a packet where a timeout occurred among the stored packets.

The TTA field check cycle illustrated in FIG. 14 will be now explained. At the start of the TTA field check cycle, in step 1401, the output controller searches for a resequencing status descriptor having the V field of zero and the TTA field of one by checking every V and TTA field of all the resequencing status descriptors. If there are found two or more resequencing status descriptors having the V field of zero and the TTA field of one, one arbitrary resequencing status descriptor among them will be chosen. After that, the output controller searches for a packet having an SCC, DSID, and NEPSN which are identical to those of the chosen resequencing status descriptor from the CAM in step 1410. If the search fails, the search will be repeatedly performed by increasing the NEPSN by one in step 1413 until the search succeeds.

Through this process, if the packet search succeeds, the V field of the resequencing status descriptor of the corresponding DSID will be set to be one and the NEPSN is increased by one in step 1414. Further, the output-ready packet buffer pointer value is changed to the address value of the occupied buffer descriptor corresponding to the packet buffer in which the packet has been stored, and the traffic priority and the RCN are recorded. In step 1415, an entry corresponding to the packet searched is deleted from the CAM and the corresponding CPC is decreased by one.

In step 1420, the PSN of the searched packet is compared with the PSN of the first entry of the resequencing timer list of the corresponding DSID. As a result of the comparison, if both values are equal, in step 1423, the first entry of the resequencing timer list of the corresponding DSID will be deleted (at this time, the entry next to the first entry becomes the first entry of the list) and the TTA field will be set to be zero. Subsequently, all the CPC field values are checked in step 1430, and if there is any CPC field value of zero, the LDA field will be set to be zero in step 1433, thereby ending the TTA field check cycle. However, if all the CPC field values are greater than zero, the process will be immediately terminated.

Figure 15:
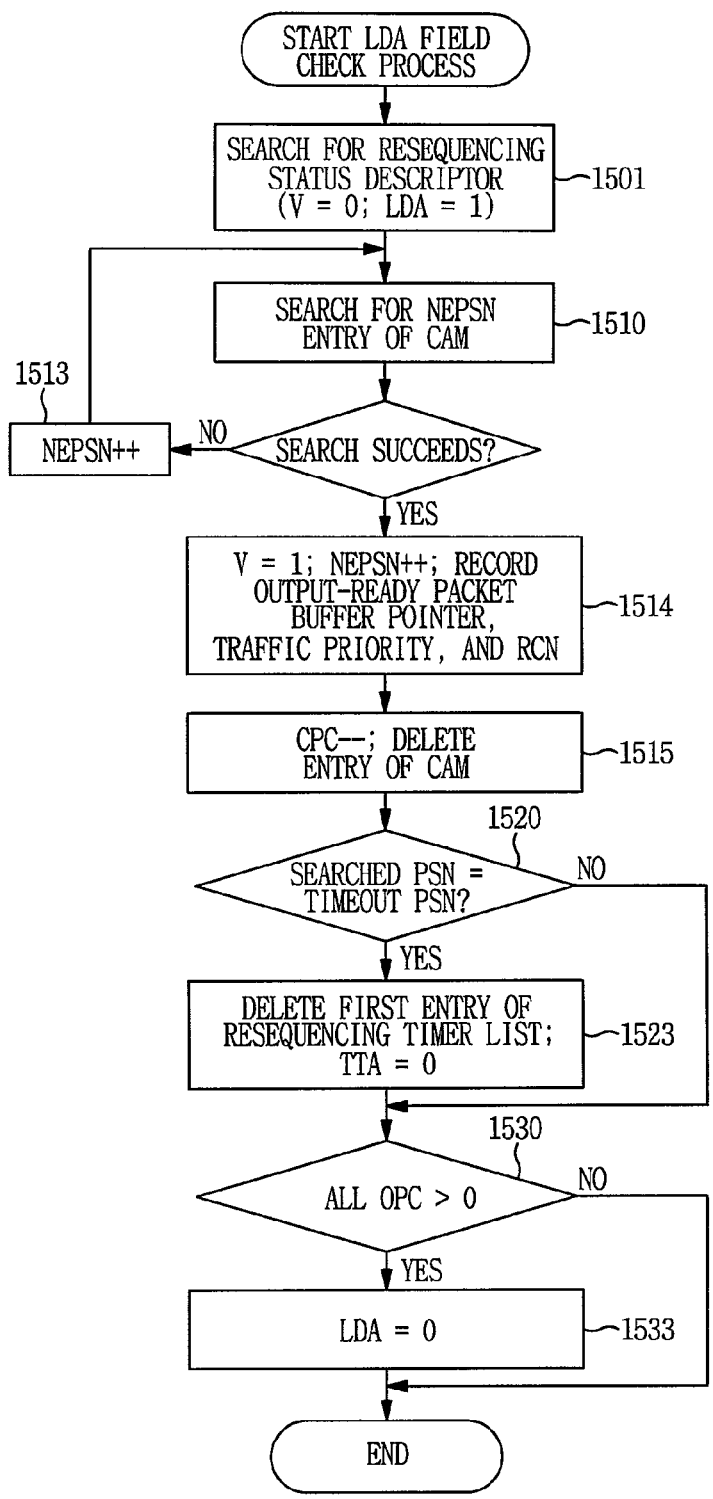
FIG. 15 depicts a flow chart for presenting a method for performing a resequencing process by detecting the loss of the resequencing packet.

FIG. 15 shows the LDA field check cycle process. In the LDA field check cycle, the output controller searches for a resequencing status descriptor having the V field of zero and the LDA field of one by checking every V and LDA field of all the resequencing status descriptors in step 1501. If there are found a plurality of resequencing status descriptors having the V field of zero and the LDA field of one, one arbitrary resequencing status descriptor among them will be chosen. After that, the output controller searches for a packet having an SCC, DSID, and NEPSN which are identical to those of the chosen resequencing status descriptor from the CAM in step 1510. If the search fails, the search will be repeatedly performed by increasing the NEPSN by one in step 1513 until the search succeeds.

Through this process, if the packet search succeeds, the V field of the resequencing status descriptor of the corresponding DSID will be set as one and the NEPSN is increased by one in step 1514. Further, the output-ready packet buffer pointer value is changed to the address value of the occupied buffer descriptor corresponding to the packet buffer in which the packet has been stored, and the traffic priority and the RCN are recorded. In step 1515, an entry corresponding to the packet searched is deleted from the CAM, and the corresponding CPC is decreased by one.

In step 1520, the PSN of the searched packet is compared with the PSN of the first entry of the resequencing timer list of the corresponding DSID. As a result of the comparison, if both values are equal, in step 1523, the first entry of the resequencing timer list of the corresponding DSID will be deleted and the TTA field will be set as zero. Subsequently, all the CPC field values are checked in step 1530, and if there is any CPC field value of zero, the LDA field will be set to be zero in step 1533, thereby ending the LDA field check cycle. However, if all the CPC field values are greater than 0, the process will be immediately terminated.

Figure 16:
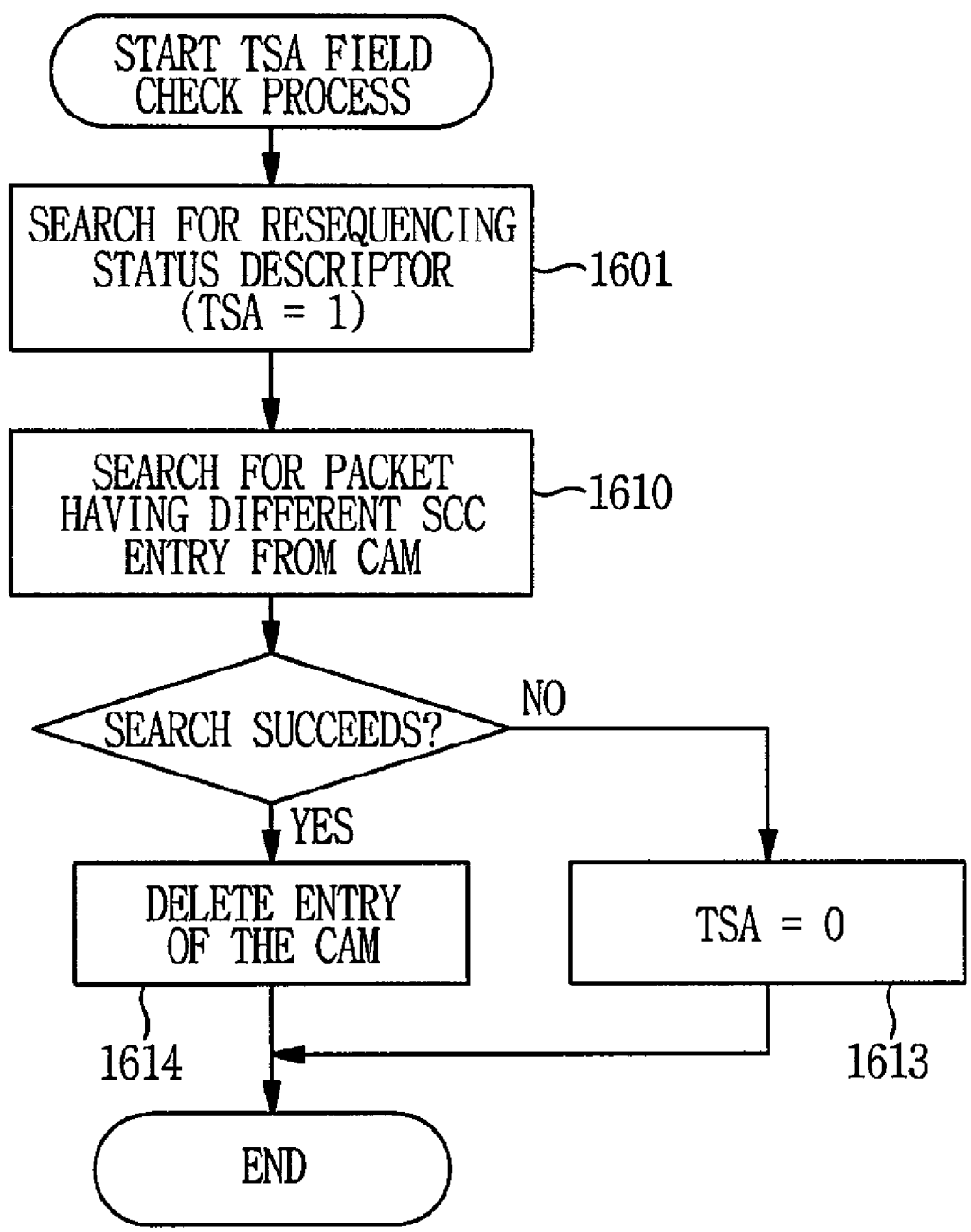
FIG. 16 offers a flow chart for describing a method for performing a resequencing process when a sequence change field of the input packet is changed.

FIG. 16 illustrates the TSA field check cycle process. Referring to FIG. 16, the output controller searches for a resequencing status descriptor having the TSA field of one among all the resequencing status descriptors in step 1601. If there are found two or more resequencing status descriptors having the TSA field of one, one arbitrary resequencing status descriptor will be chosen among them. After that, the output controller searches for a packet having a different current SCC and an identical DSID with that of the searched and selected resequencing status descriptor from the CAM in step 1610. If the search succeeds, the corresponding entry of the packet searched will be deleted from the CAM in step 1614. On the contrary, if no packet is found, the TSA field will be set to be zero, thereby terminating the TSA field check process.

Figure 17:
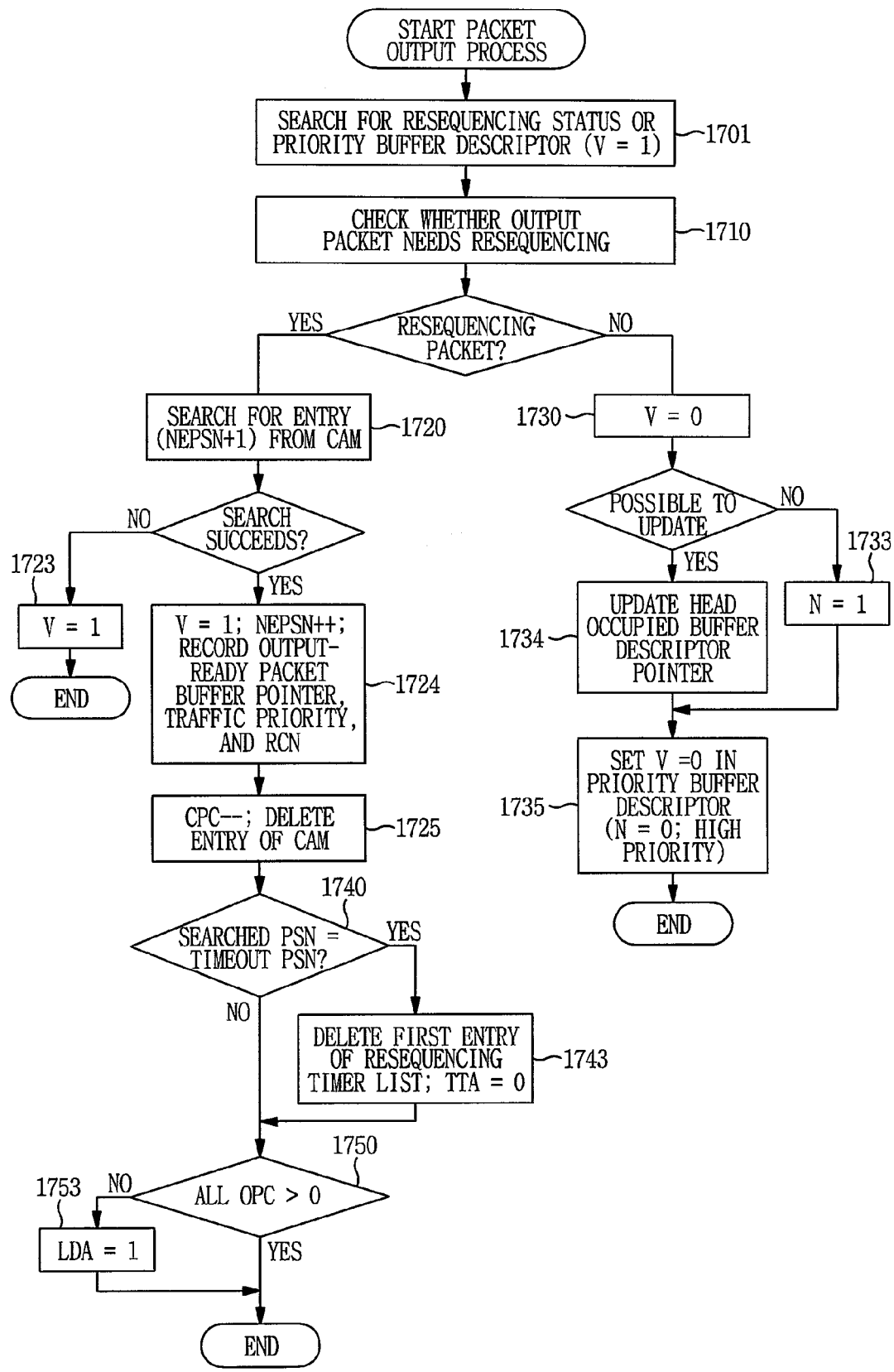
FIG. 17 is a flow chart for explaining a method for outputting the packets stored in the packet buffer.

FIG. 17 shows the packet output cycle. At the start of the packet output check cycle, the output controller searches for a resequencing status descriptor or priority buffer descriptor having the V field of one among the sixteen resequencing status descriptors and eight priority buffer descriptors in step 1701. If two or more resequencing status descriptors or priority buffer descriptors having the V field of one are found, one of them will be selected on the basis of the traffic priority. Further, if there are two or more descriptors of the same traffic priority, one of them will be selected arbitrarily, and the packet stored in the packet buffer indicated by the selected resequencing status descriptor or priority buffer descriptor will be outputted.

In step 1710, it is checked whether the outputted packet needs resequencing, and in case of the packet for which resequencing is not necessary, the V field of the corresponding priority buffer descriptor will be set as zero in step 1730, and then it is determined whether the head occupied buffer descriptor pointer value can be updated. If it cannot be updated, an N field thereof will be set as one in step 1733. Otherwise, if it can be updated, the head occupied buffer descriptor pointer value is updated, in step 1734, to the occupied buffer descriptor pointer value of the occupied buffer descriptor corresponding to the packet buffer in which the packet finally outputted has been stored. Next, the output controller selects a priority buffer descriptor, which has the highest priority among priority buffer descriptors having the N field of zero, among the eight priority buffer descriptors in step 1735, and sets the V field thereof as one, thus terminating the packet output process.

Meanwhile, if it is determined, in step 1710, that a resequencing packet has been outputted, the output controller will increase the NEPSN of the resequencing status descriptor of the corresponding DSID of the output packet by one and a packet having the increased NEPSN will be searched from the CAM in step 1720. If the search fails, the V field of the resequencing status descriptor of the corresponding DSID will be set as zero in step 1723 and the packet output process will be terminated. On the contrary, if the packet search succeeds, the V field of the resequencing status descriptor of the corresponding DSID will be set to be one and the NEPSN will be increased by one in step 1724. Further, the output-ready packet buffer pointer value is changed to the address value of the occupied buffer descriptor corresponding to the packet buffer in which the packet has been stored, and the traffic priority and the RCN are recorded. After that, an entry corresponding to the searched packet is deleted from the CAM and the CPC is decreased by one in step 1725.

Subsequently, the PSN field value of the searched packet is compared with that of the first entry of the resequencing timer list of the corresponding DSID in step 1740. As a result of the comparison, if both values are equal the first entry of the resequencing timer list of the corresponding DSID will be deleted and the TTA field will be set as zero in step 1743. Then, all the CPC field values are checked in step 1750. If there is any CPC field value of zero, the LDA field will be set to be zero in step 1753, thereby ending the packet output process. However, if all the CPC field values are greater than zero, the process will be immediately terminated.

Figure 18:
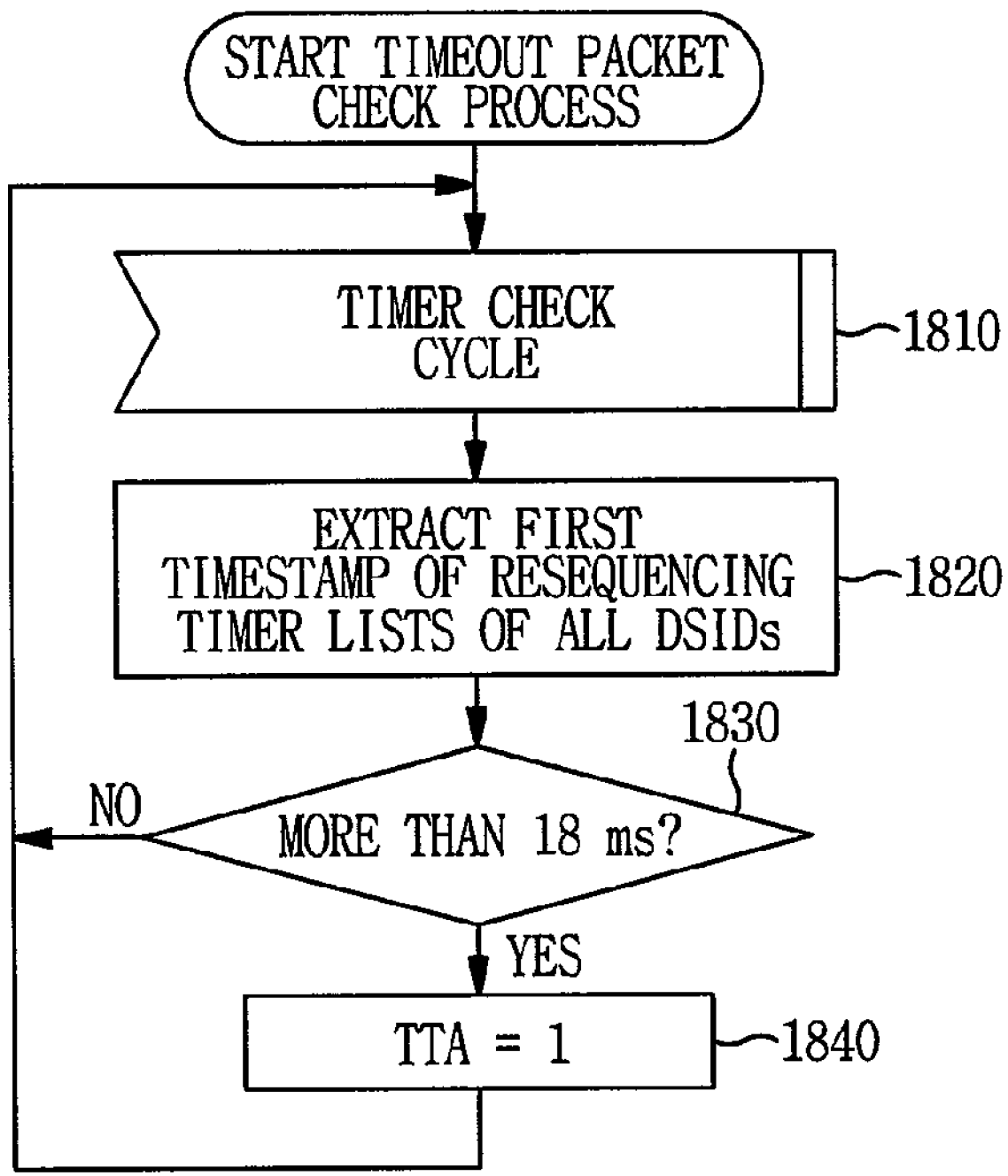
FIG. 18 is a flow chart for describing a method for detecting a packet where a timeout occurred among the resequencing packets stored in the packet buffer.

Especially, the packets which need resequencing among the packets stored in the packet buffer by the input controller are required to be outputted immediately if a timeout occurs after a specific time elapses, and the timer controller detects the packet where such a timeout occurred. FIG. 18 is a flow chart for describing a timer check process performed by the timer controller.

When the timer controller finds a packet where a timeout occurred, it sets the TTA field of the resequencing status descriptor of the corresponding DSID of the packet where the timeout occurred to be one. Specifically, in every timer check cycle 1810 repeated at a specific period, the timer controller extracts the timestamp of the foremost resequencing timer for each DSID resequencing timer lists in step 1820, and compares the corresponding timestamp value with the current time in step 1830. As a result of the comparison, it is checked whether the difference between the current time and the timestamp value, which is a waiting time, is greater than a specific value, e.g., 18 ms in this embodiment. If the waiting time is not longer than 18 ms, the process will return to the start of the cycle. On the other hand, if the waiting time is longer than 18 ms, the TTA field of the resequencing status descriptor of the corresponding DSID will be set as one to thereby notify the output controller of existence of the packet where the timeout occurred in step 1840, so that the packet where the timeout occurred can be outputted immediately.

The packet processing method of the present invention can be implemented as program commands executable on various computer devices to be recorded on a computer readable storage medium. The program commands, data files, data structures, and the like may be included in the computer readable storage medium separately or combined with each other. The program commands recorded on the medium may be specially designed or configured for the present invention, or well known to those skilled in the computer software art. As the computer readable storage medium, for example, a magnetic medium such as a hard disk, a floppy disk or a magnetic tape, an optical medium such as a CD-ROM or a DVD, a magneto-optical medium such as a floptical disk, and a hardware device specially designed to store and perform program commands such as a ROM, a RAM or a flash memory may be used.

The medium may be a transmission medium, e.g., an optical fiber, a metal line or a waveguide, which includes carriers for transmitting signals designating the program commands, the data structures or the like. The program commands include, for example, a high level language code executable on a computer by using an interpreter as well as a machine language code generated by an assembler or a compiler. The hardware device may be designed to operate as one or more software modules to perform the operations of the present invention, and vice versa.

While the invention has been shown and described with respect to the embodiments, it will be understood by those skilled in the art that various changes and modifications may be made without departing from the scope of the invention as defined in the following claims.

What is claimed is:

1. A packet processing apparatus of a cable modem in hybrid fiber coaxial networks for processing a packet received from a cable modem termination system through a plurality of downstream channels, wherein a specific channel number is assigned to each channel and the cable modem termination system transmits downstream service identifier encoding information to the cable modem during an initializing process therebetween, the apparatus comprising:
   a plurality of channel receivers, each for generating an interface packet by inserting the channel number of a corresponding channel into the packet received through the corresponding channel;
   an input controller electrically connected to the plurality of channel receivers, the input controller configured to classify the interface packet into a resequencing packet, which needs to be resequenced, and an ordinary packet, for which resequencing is not necessary, using the downstream service identifier encoding information and stores the resequencing packet and the ordinary packet;
   a packet buffer storage electrically connected to the input controller, the packet buffer storage including a plurality of packet buffers for storing therein the resequencing packets and the ordinary packets; and
   a packet information storage electrically connected to the input controller, the packet information storage configured to store information on the packets stored in the packet buffers;
   wherein the packet buffer storage is formed of a packet buffer whose size is adjustable by a user; and
   wherein the packet information storage stores therein:
      a plurality of buffer descriptors, each buffer descriptor having a one-to-one correspondence with each packet buffer and storing information on the packet stored in the corresponding packet buffer;
      a free buffer list for indicating empty packet buffers; and
      a resequencing status list having a resequencing status descriptor for each downstream service, the resequencing status descriptor including a packet sequence number of a next output packet, an available buffer size and a pointer pointing to a buffer descriptor corresponding to a packet buffer in which an output-ready resequencing packet is stored.

2. The packet processing apparatus of claim 1, further comprising an output controller for outputting the stored resequencing and ordinary packets according to a traffic priority based on priority information recorded in the interface packet.

3. The packet processing apparatus of claim 2, wherein the output controller resequences the resequencing packets based on a packet sequence number recorded in the resequencing packet and then outputs the resequencing packets in an order in which the resequencing packets are resequenced.

4. The packet processing apparatus of claim 2, further comprising:
   a timer controller for checking an occurrence of a timeout of the resequencing packet by comparing a timestamp recorded in the resequencing packet with the current time,
   wherein the output controller preferentially outputs a resequencing packet on which the timer controller determines that a timeout occurs.

5. A packet processing method of a cable modem in a hybrid fiber coaxial networks for processing a packet received from a cable modem termination system through a plurality of downstream channels, specific channel number being assigned to each channel and the cable modem termination system transmits downstream service identifier encoding information to the cable modem during an initializing process therebetween, the method comprising:
   generating an interface packet by inserting the channel number of a corresponding channel into the packet received through the corresponding channel;
   classifying the interface packet into a resequencing packet, which needs to be resequenced, and an ordinary packet, for which resequencing is not necessary, using the downstream service identifier encoding information;
   storing the resequencing packet and the ordinary packet in a packet buffer; and
   separately storing information on the resequencing and ordinary packets, which have been stored in the packet buffer;
   wherein the information on the resequencing and ordinary packets includes:
      a plurality of buffer descriptors, each being one-to-one correspondence with each packet buffer and storing information on the packet stored in the corresponding packet buffer;
      a free buffer list for indicating empty packet buffers; and
      a resequencing status list having a resequencing status descriptor for each downstream service, the resequencing status descriptor including a packet sequence number of a next output packet, an available buffer size and a pointer pointing to a buffer descriptor corresponding to a packet buffer in which an output-ready resequencing packet is stored.

6. The packet processing method of claim 5, further comprising:
   outputting the stored resequencing and ordinary packets according to a traffic priority based on priority information recorded in the interface packet.

7. The packet processing method of claim 6, wherein, outputting the packets includes:
   checking an occurrence of a timeout of the resequencing packet by comparing a timestamp recorded in the resequencing packet with the current time; and
   preferentially outputting a resequencing packet on which a timeout has occurred.

8. The packet processing apparatus of claim 1, wherein the input controller is further configured:
   wherein if the interface packet is classified into an ordinary packet, the input controller checks the free buffer list to determine whether the packet buffer storage has at least one empty packet buffer for storing therein the ordinary packet;
   wherein if the packet buffer storage has said at least one empty packet buffer, the input controller stores the ordinary packet in said at least one empty packet buffer and records information on the ordinary packet in the buffer descriptor; and
   wherein if the packet buffer storage does not have said at least one empty packet buffer, the input controller deletes the ordinary packet.

9. The packet processing apparatus of claim 1, wherein if the interface packet is classified as a resequencing packet, the input controller is configured to determine whether a timeout occurs, and delete the resequencing packet if it is determined that the timeout does not occur.

10. The packet processing apparatus of claim 9, wherein if it is determined that the timeout occurs, the input controller is configured to compare a packet sequence number recorded in the resequencing packet with a resequencing window size calculated by a sum of the packet sequence number of the next output packet and the available buffer size stored in the resequencing status descriptor, and delete the resequencing packet if the packet sequence number is greater than the resequencing window size.

11. The packet processing apparatus of claim 10, wherein if the packet sequence number is equal to or less than the resequencing window size, the input controller is configured to check the free buffer list to determine whether the packet buffer storage has at least one empty packet buffer for storing therein the resequencing packet;

wherein if it is determined that the packet buffer storage has said at least one empty packet buffer, the input controller stores the resequencing packet in said at least one empty packet buffer and records information on the resequencing packet in the buffer descriptor; and wherein if it is determined that the packet buffer storage does not have said at least one empty packet buffer, the input controller deletes the resequencing packet.

12. The packet processing apparatus of claim 1, wherein the resequencing status descriptor further includes a channel packet counter for each downstream channel through which a packet is received, the channel packet counter being increased by one whenever the packet received through the downstream channel is stored in the packet buffer; and wherein the input controller performs packet loss detection by checking whether all channel packet counters are greater than zero.

\* \* \* \* \*